(12) United States Patent
Schnitta

(10) Patent No.: US 10,490,178 B2
(45) Date of Patent: Nov. 26, 2019

(54) PERFORATION ACOUSTIC MUFFLER ASSEMBLY AND METHOD OF REDUCING NOISE TRANSMISSION THROUGH OBJECTS

(71) Applicant: Bonnie S. Schnitta, East Hampton, NY (US)

(72) Inventor: Bonnie S. Schnitta, East Hampton, NY (US)

( * ) Notice: Subject to any disclaimer, the term of this patent is extended or adjusted under 35 U.S.C. 154(b) by 0 days.

(21) Appl. No.: 15/132,089

(22) Filed: Apr. 18, 2016

(65) Prior Publication Data

US 2016/0232885 A1 Aug. 11, 2016

Related U.S. Application Data

(63) Continuation-in-part of application No. 14/523,875, filed on Oct. 25, 2014, now Pat. No. 9,316,133, which
(Continued)

(51) Int. Cl.
*G10K 11/16* (2006.01)
*F24F 13/24* (2006.01)
(Continued)

(52) U.S. Cl.
CPC ............ *G10K 11/16* (2013.01); *B32B 5/024* (2013.01); *B32B 5/24* (2013.01); *B32B 7/02* (2013.01); *B32B 7/12* (2013.01); *E04B 9/001* (2013.01); *E04B 9/006* (2013.01); *E04B 9/02* (2013.01); *F24F 13/24* (2013.01); *G10K 11/168* (2013.01);
(Continued)

(58) Field of Classification Search
CPC ...... G10K 11/168; G10K 11/16; E04B 9/001; E04B 9/006; F24F 13/24; F24F 2013/242
USPC ....... 181/210, 200, 201, 205, 295, 224, 225, 181/226; 454/184
See application file for complete search history.

(56) References Cited

U.S. PATENT DOCUMENTS 701,496 A * 6/1902 McKinnie .............. B01D 46/10
181/256
2,091,774 A * 8/1937 Weiland .................... F24F 6/04
181/200
(Continued)

FOREIGN PATENT DOCUMENTS

DE 3132169 A1 * 3/1983 .............. F01N 1/24
JP 63120809 A * 5/1988

*Primary Examiner* — Edgardo San Martin
(74) *Attorney, Agent, or Firm* — John F. Vodopia

(57) ABSTRACT

A rugged noise muffler system is configured to substantially surround sound-emitting openings in a working unit or structure, to absorb sound emitted from the sound-emitting openings. A barrier component, formed as a housing, covers a sound emitting opening to inhibit sound from emanating from the housing, except at an open end of the housing. Each sound emitting opening in the working unit or structure requires a housing positioned over same. The housing includes a hood portion and an elongate portion that includes the open end of the housing. The inner surfaces of the hood portion and an elongate portion are lined with sound absorbing material. The emitted sound first enters the hood portion, is partially absorbed therein and any unabsorbed sound passes into and is substantially absorbed in the elongate portion as the sound travels towards the open end of the housing.

12 Claims, 22 Drawing Sheets

Related U.S. Application Data is a continuation-in-part of application No. 14/455,693, filed on Aug. 8, 2014, now Pat. No. 9,181,695, which is a continuation-in-part of application No. 11/017,642, filed on Dec. 22, 2004, now Pat. No. 8,827,033.

(60) Provisional application No. 60/530,981, filed on Dec. 22, 2003, provisional application No. 61/895,841, filed on Oct. 25, 2013.

(51) Int. Cl.

| | | |
|---|---|---|
| *E04B 9/00* | (2006.01) | |
| *H04R 1/28* | (2006.01) | |
| *B32B 5/02* | (2006.01) | |
| *B32B 5/24* | (2006.01) | |
| *B32B 7/02* | (2019.01) | |
| *B32B 7/12* | (2006.01) | |
| *G10K 11/168* | (2006.01) | |
| *E04B 9/02* | (2006.01) | |
| *E04B 2/74* | (2006.01) | |

(52) U.S. Cl.
CPC ...... *H04R 1/2803* (2013.01); *B32B 2262/101* (2013.01); *B32B 2307/102* (2013.01); *B32B 2419/00* (2013.01); *E04B 2/7409* (2013.01); *E04B 2/7457* (2013.01); *F24F 2013/242* (2013.01)

(56) References Cited

U.S. PATENT DOCUMENTS

| | | | | |
|---|---|---|---|---|
| 2,270,825 | A * | 1/1942 | Parkinson | G10K 11/161 181/224 |
| 2,328,761 | A * | 9/1943 | Wamnes | E06B 7/02 454/195 |
| 2,394,342 | A * | 2/1946 | Tominaga | E04B 1/8218 181/200 |
| 2,644,389 | A * | 7/1953 | Dauphinee | F16L 55/02 181/224 |
| 2,704,504 | A * | 3/1955 | Wilkening | E06B 7/02 181/224 |
| 2,950,776 | A * | 8/1960 | Stephens | F24F 13/24 181/224 |
| 3,061,056 | A * | 10/1962 | Kodaras | E06B 5/20 181/290 |
| 3,110,357 | A * | 11/1963 | Jenn | F24F 7/025 181/224 |
| 3,295,273 | A * | 1/1967 | Wehe, Jr. | E06B 3/822 181/292 |
| 3,319,559 | A * | 5/1967 | Raider | F24F 13/078 181/224 |
| 3,789,747 | A * | 2/1974 | Wasserman | F24F 7/08 454/186 |
| 3,841,434 | A * | 10/1974 | Culpepper, Jr. | F01N 1/24 126/299 D |
| 3,963,094 | A * | 6/1976 | Nowikas | E04B 1/8218 181/198 |
| 4,020,900 | A * | 5/1977 | Kitagawa | B60K 11/04 123/41.49 |
| 4,050,364 | A * | 9/1977 | Maus | E06B 7/02 181/224 |
| 4,332,114 | A * | 6/1982 | Goebel | F24F 13/20 182/47 |
| 4,605,091 | A * | 8/1986 | Iida | E04B 1/84 181/224 |
| 4,759,194 | A * | 7/1988 | Shapiro | F24F 13/00 62/262 |
| 4,850,266 | A * | 7/1989 | Bennett | F24F 13/0227 454/284 |
| 5,526,228 | A * | 6/1996 | Dickson | G06F 1/20 361/695 |
| 5,851,144 | A * | 12/1998 | Nystrom | F24F 13/06 454/306 |
| 6,023,938 | A * | 2/2000 | Taras | B60H 1/00507 454/206 |
| 6,104,608 | A * | 8/2000 | Casinelli | F24F 13/24 181/224 |
| 6,198,627 | B1 * | 3/2001 | Roehling | G06F 1/181 361/679.33 |
| 6,606,876 | B1 * | 8/2003 | Giordano | B60H 1/00371 181/200 |
| 6,953,104 | B2 * | 10/2005 | Monson | E04F 17/04 181/205 |
| 7,530,189 | B2 * | 5/2009 | Kim | F24F 1/0007 40/725 |
| 7,549,505 | B1 * | 6/2009 | Kawar | G06F 1/18 181/202 |
| 7,644,803 | B2 * | 1/2010 | Hashizume | F04D 29/545 181/206 |
| 7,690,143 | B2 * | 4/2010 | Kim | F24F 1/0007 40/711 |
| 7,980,357 | B2 * | 7/2011 | Edwards | F01D 25/30 181/264 |
| 8,061,474 | B2 * | 11/2011 | Schnitta | G10K 11/168 181/205 |
| 8,146,707 | B2 * | 4/2012 | Choi | F24F 1/0007 181/198 |
| 8,266,916 | B2 * | 9/2012 | Dillon | F24F 1/0007 62/115 |
| 8,336,672 | B2 * | 12/2012 | Derks | F16L 55/033 181/224 |
| 8,408,356 | B2 * | 4/2013 | Yamaguchi | H05K 7/20736 181/198 |
| 8,490,743 | B2 * | 7/2013 | Schnitta | G10K 11/168 181/148 |
| 8,640,819 | B2 * | 2/2014 | Seedorf | F04B 53/002 181/205 |
| 8,827,033 | B2 * | 9/2014 | Schnitta | B32B 7/02 181/148 |
| 9,181,695 | B2 * | 11/2015 | Schnitta | B32B 7/02 |
| 9,316,133 | B2 * | 4/2016 | Schnitta | F01N 1/00 |
| 9,326,427 | B2 * | 4/2016 | Li | H05K 5/0213 |
| 9,504,182 | B2 * | 11/2016 | Olsson | H02B 1/56 |
| 2006/0185931 | A1 * | 8/2006 | Kawar | G06F 1/18 181/202 |
| 2006/0254854 | A1 * | 11/2006 | Herrera | A47L 15/4209 181/200 |
| 2007/0011930 | A1 * | 1/2007 | Yarmosh | A47G 5/00 40/725 |
| 2009/0133957 | A1 * | 5/2009 | Owens | F24F 13/24 181/224 |
| 2011/0159796 | A1 * | 6/2011 | Carpenter | F24F 3/16 454/258 |
| 2011/0232701 | A1 * | 9/2011 | Colon | A47L 15/4246 134/198 |
| 2012/0298154 | A1 * | 11/2012 | Rockwell | D06F 39/12 134/184 |
| 2015/0101883 | A1 * | 4/2015 | Xu | F24F 13/082 181/224 |

* cited by examiner

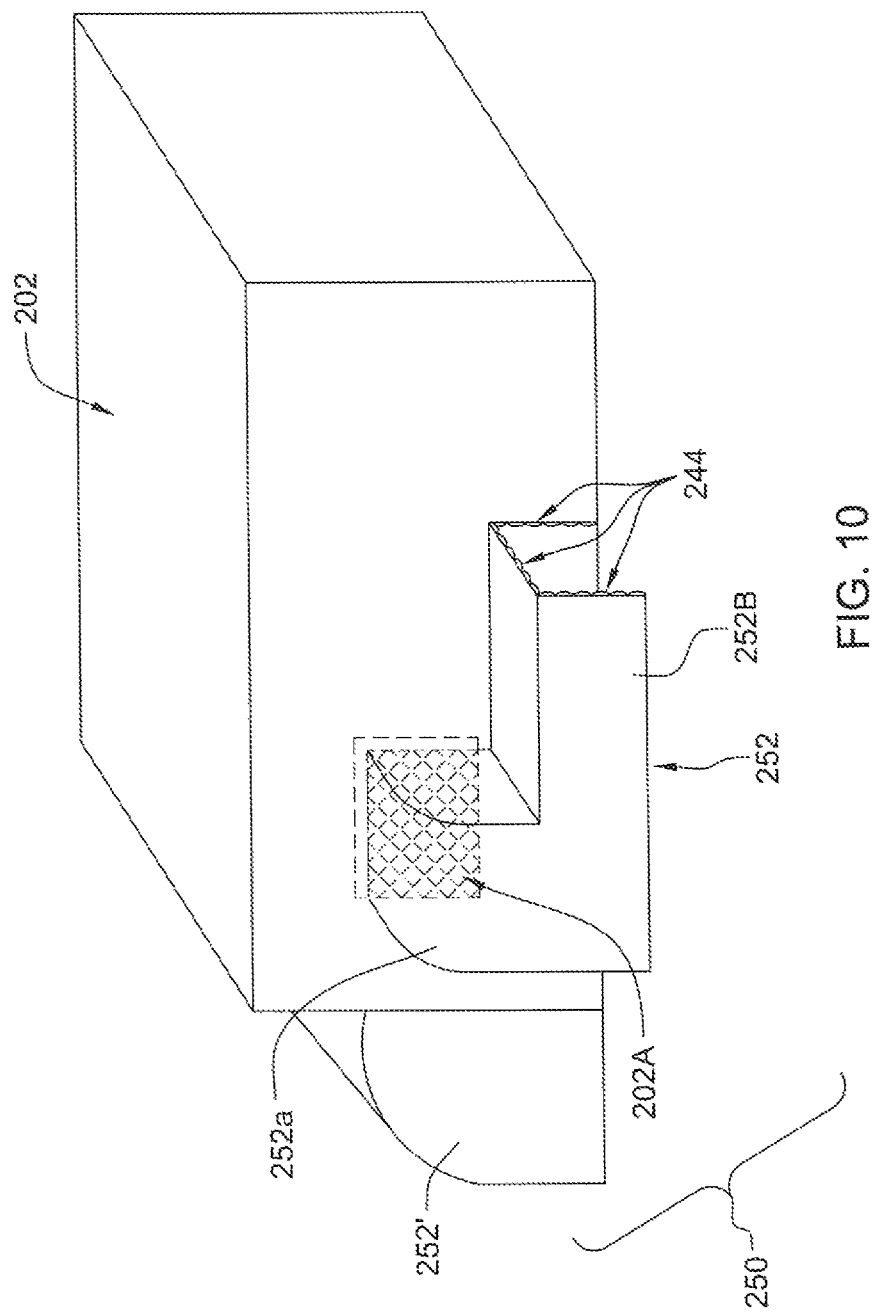

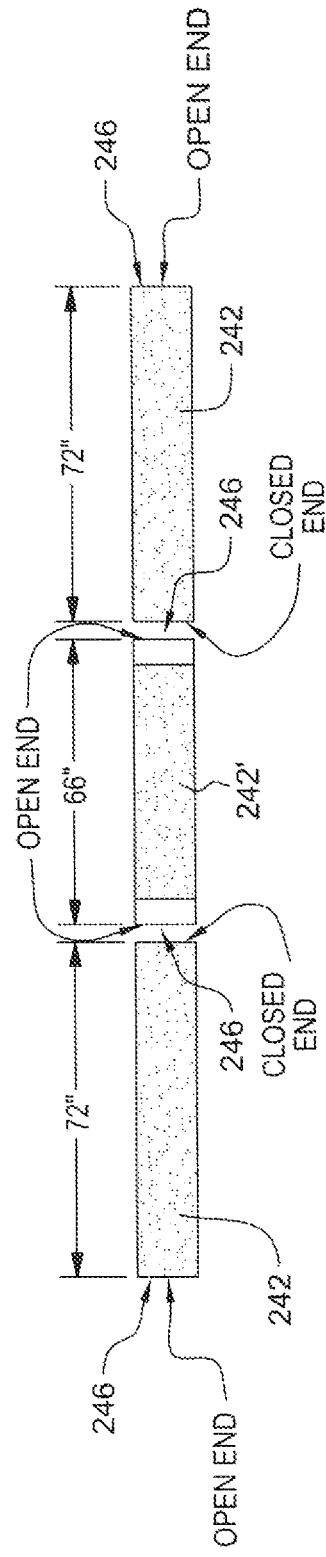

PERFORATION ACOUSTIC MUFFLER ASSEMBLY AND METHOD OF REDUCING NOISE TRANSMISSION THROUGH OBJECTS

CROSS-REFERENCE TO RELATED APPLICATIONS

This application is a continuation-in-part (CIP) application based upon U.S. patent application Ser. No. 14/523,875, filed Oct. 25, 2014; U.S. patent application Ser. No. 14/523,875 is a continuation-in-part (CIP) application based upon U.S. patent application Ser. No. 14/455,693, filed on Aug. 8, 2014 and upon U.S. Provisional Patent Application Ser. No. 61/895,841, filed on Oct. 25, 2013; U.S. patent application Ser. No. 14/455,693 is a continuation-in-part (CIP) application based upon U.S. patent application Ser. No. 11/017,642, filed on Dec. 22, 2004 ('642 application), which '642 application is based upon and derives the benefit of the filing date of U.S. Provisional Patent Application No. 60/530,981, filed Dec. 22, 2003; the contents of U.S. patent application Ser. No. 14/523,875, U.S. patent application Ser. No. 14/455,693, U.S. Provisional Patent Application Ser. No. 61/895,841, U.S. patent application Ser. No. 11/017,642 and U.S. Provisional Patent Application No. 60/530,981, are incorporated herein by reference.

BACKGROUND OF THE INVENTION

The present invention relates to a system for attenuating noise. In particular, the present invention relates to a system for attenuating noise that may be emitted from a room through a hole or opening. Additionally, the invention can attenuate noise when the opening houses any low STC object that cannot be completely enclosed, such as a recessed light fixture. The present invention further relates to a methodology for attenuating noise from a room that contains at least one hole or opening for receiving a low STC object that cannot be completely enclosed, such as a recessed light fixture or other mechanism.

Hearing noises such as for example, footsteps, speech, music or environmental sounds from adjacent rooms, upper floors, pipes, outside the dwelling or adjacent dwellings is something that many people experience on a daily basis. At a minimum, it can be distracting. Many spend large sums of money to reduce the overall transmission of sound into and/or through their dwellings in order to create quieter surroundings. Various sound insulating techniques exist to significantly reduce and/or limit the transmission of sound through the walls, ceilings and other objects contained in today's commercial and residential buildings. A great deal of attention is paid to the configuration of the walls, floors and ceilings and the materials forming the same to provide for high transmission loss, which minimizes the transmission of noise from one room or space to another.

The ability of the configuration with its specified materials to reduce or prevent sound passing through the configuration is denoted by its STC. STC stands for "sound transmission class" and is a single number rating derived from measured values of sound transmission loss in accordance with the American Society for Testing and Materials (ASTM) E90 standards. The transmission loss through an object is a measure of its effectiveness in preventing the sound power incident on one side of the object from being transmitted through it and radiated on the other side. The STC provides a single number estimate of an object's performance for certain common sound reduction applications.

Typically, ceilings and walls have openings and/or holes formed, therein to receive various devices including electrical outlets, air ducts, lighting, speakers, etc. While the walls, floors and ceilings can be adequately insulated to limit noise transmission, these openings have an adverse impact on the transmission loss. As such, noise can enter the room or space through the opening and the device mounted therein.

SUMMARY OF THE INVENTION

In response to the foregoing challenges, applicant has developed an innovative noise attenuation system for use in a structure having a hole for some type of mechanism, such as a recessed light fixture mounted therein, which cannot be addressed with a complete acoustic enclosure, due to required air flow for heat dissipation, or a needed opening, such as when a large quantity of wires is required. The noise attenuation system is constructed to permit the absorption of noise emitted into the structure from the mechanism such that the transmission loss of the structure is not adversely impacted by the presence of the opening and the mechanism located therein. The noise attenuation system is also constructed to permit dissipation of heat from the mechanism, if required.

The noise attenuation includes a noise absorbing muffler positioned over the hole through which the noise is being emitted. The noise absorbing muffler includes an outer high STC barrier layer that limits the passage of sound waves emitted from the mechanism therethrough. The noise absorbing muffler further includes a noise absorbing layer positioned adjacent to the outer barrier layer. The noise absorbing layer absorbs a predetermined amount of sounds waves emitted from the mechanism. An optional third layer can be secured to the barrier layer, which would be a noise decoupling layer. This is most commonly used when low frequency noise may need to be decoupled from the structure. A fourth optional layer can be secured to the outer most layer that is a protective shell. This is most commonly used when the muffler needs to be protected from such items as vandalism.

Applicant has also developed an innovative method for attenuating noise emitted from a recessed light fixture mounted in an opening in a structure. The method includes determining the minimum length of a noise attenuating muffler based upon a predetermined wavelength of a sound wave. Once the proper length of muffler is determined, the noise attenuating muffler is located within the structure in an area surrounding the mechanism. The noise attenuating muffler substantially absorbs the sound waves emitted into structure from the recessed fixture. Thus, when the sound exits the muffler the reduction in noise is equal to the transmission loss that would have occurred had there never been a hole.

In another embodiment, the invention provides a noise muffler configured to substantially surround a sound generating object, disposed in or to be disposed in, a structure including a wall or ceiling to be sound limited by, and attenuate sound emitted from the sound generating object, the wall or ceiling including a board having an exposed surface and an opposite surface.

The noise muffler comprises front, rear, left and right sides and a bottom connected to each of the front, rear, left and right sides to form a muffler cavity defining an inner volume. The sound generating object is positioned in the muffler cavity. The front, rear, left and right sides, and the bottom of the muffler are formed with an outer barrier layer. At least one of the front, rear, left, right sides and bottom of the muffler are formed with a noise absorbing layer positioned adjacent the outer barrier layer to absorb a predetermined amount of sound emitted from the object. At least one of the front, rear, left and right sides includes a first opening into the inner volume of the muffler cavity, wherein a size of the opening is adjustable.

Each of the front, rear, left and right sides are bordered by top, bottom, left and right ends, and wherein the left and right ends of each side is connected to the right and left ends of sides positioned to the left and right, respectively. The bottom is bordered with front, rear, left and rights ends, wherein each of the ends is connected to bottom ends of the front, rear, left and right sides to form the muffler cavity. A first primary flap is attached to and extending from an end of at least one of the front, rear, left, right sides of the muffler, opposite the end attached to the bottom. The first opening in the at least one side is arranged proximate the first primary flap. A first secondary flap is arranged in the muffler proximate the first opening, opposite the first primary flap, and wherein a physical distance separating the first primary flap and the first secondary flap defines a size of the first opening.

The first secondary flap includes a first end and a second end and wherein a first extension member extends from the second end, substantially in parallel with the at least one side, for part of the extent of the at least one side between the top and bottom ends thereof, forming a first channel in fluid communication with the first opening. The first channel is in fluid communication with the volume of the muffler cavity. The first opening and the first channel together act as a baffle.

A second primary flap is attached to and extending from an end of another of the front, rear, left, right sides, which opposes the at least one side of the muffler, opposite the end attached to the bottom. A second opening is included in the another side arranged proximate the second primary flap. A second secondary flap is arranged in the muffler proximate the second opening, opposite the second primary flap, and wherein a physical distance separating the second primary flap and the second secondary flap defines a size of the opening. The second secondary flap includes a first and end a second end and wherein a second extension member extends from the second end, substantially in parallel with the another side, for part of the extent of the another side between the top and bottom ends thereof, forming a second channel in fluid communication with the second opening. The second channel is in fluid communication with the volume of the muffler cavity. The first and second openings are in fluid communication with each other through the first and second channels and inner volume of the muffler cavity. Preferably, the size of the opening is adjustable by adjusting a position of the first primary flap.

In another embodiment, the invention provides a rugged noise muffler system is configured to substantially surround one or more sound-emitting openings in a working unit or structure, to absorb sound emitted from the sound-emitting openings in order that sound detected at the working unit or structure does not exceed a predetermined level. The system includes a barrier formed as a housing to cover a sound emitting opening of the working unit or structure to inhibit sound from emanating from the housing, except at an open end of the housing. Each sound emitting opening in the working unit or structure requires a housing positioned over same. The housing includes a hood portion and an elongate portion that includes the open end of the housing. The inner surfaces of the hood portion and an elongate portion are lined with sound absorbing material. The sound emitted from the sound emitting opening first enters the hood portion and is partially absorbed therein. Any unabsorbed sound from the hood portion passes into and is substantially absorbed in the elongate portion as the sound travels towards the open end of the housing.

At least one of the hood portion and the elongate portion is open to the ground and the elongate portion includes the housing open end to facilitate gaseous intake or gaseous exhaust carried out by the working unit or structure through the sound emitting opening. The length of the hood portion, the elongate portion or both is defined in consideration of the frequency of the sound emitted from the sound emitting opening. The length of the hood portion, the elongate portion or both is defined in consideration of the loudness of the sound emitted from, the sound emitting opening. Preferably, however, the length of the hood portion, the elongate portion or both is defined in consideration of the STC and NRC of the sound absorbing material, the thickness of the sound barrier/absorbing acoustic rated material or both.

In another embodiment, the invention provides a rugged muffler system configured to substantially surround one or more sound-emitting openings in a working unit or structure, to absorb sound emitted from the sound-emitting openings in order that sound detected at the working unit or structure does not exceed a predetermined level. At least one barrier formed as a housing to cover a sound emitting opening of the working unit or structure to inhibit sound from emanating from the housing, except at a first barrier opening. The housing is elongate and includes first end second opposing housing ends and is constructed to withstand compressive forces. The first barrier opening is positioned at one of the first and second housing ends to facilitate a free exchange of gases. The housing has a predefined length from the sound emitting opening in the working unit or structure to the first barrier opening. Inner surfaces of the housing are lined with at least one layer of sound absorbing material to absorb the sound emitted from the sound emitting opening as the sound travels the length of the barrier.

The housing is preferably made of metal, but may be made of hard plastic or polyvinyl chloride. In an alternative form, the housing has a height of 8 or less inches from the ground and, where necessary, a second barrier opening for free exchange of gases at the other one of the first and second housing ends. The housing may be configured without a bottom housing part and, for positioning on the ground or other base surface. Both the ground or other base surface, and the sound attenuating material act to absorb sound emitted from the sound emitting opening of the working unit or structure before same reaches one of the first and second barrier openings. Two, three, four, five . . . housings may be included, where necessary, for positioning to cover and prevent sound from emanating from two, three, four, five . . . sound emitting openings.

In another embodiment, the invention provides a noise attenuation system comprising an enclosure configured to substantially surround at least one sound-emitting or sound-transferring opening in a working unit or structure that is positioned in a room or space, and to inhibit a direct acoustic path of sound emitted from or entering into the sound-emitting or sound-transferring opening, from or into the room or space in order that sound detected at the working unit or structure does not exceed a predetermined level.

The enclosure comprises a sound absorbing muffler plate that covers the at least one sound-emitting or sound-transferring opening in the working unit or structure to inhibit sound from emanating from the working unit or structure into the room or space. An aperture is formed in the sound-absorbing muffler plate at a predetermined distance from a location of the at least one sound-emitting or sound-transferring opening in the working unit or structure. The sound emitted from or entering the sound-emitting or sound-transferring opening travels along the predetermined distance of the sound-absorbing muffler plate to the aperture, during which travel sound is absorbed, so that the sound detected outside the working unit or structure does not exceed the predetermined level sound.

The predetermined distance may be calculated in consideration of a singular or average frequency of the sound emitted from or entering into the at least one sound-emitting or sound-transferring opening. Also, the predetermined distance may be calculated in consideration of a loudness of the sound emitted from or entering into the at least one sound-emitting or sound-transferring opening. The noise absorbing muffler plate may comprise at least one layer of sound absorbing material. Preferably, the noise absorbing muffler plate includes an STC barrier layer upon which the at least one layer of sound-absorbing material is disposed. The noise absorbing muffler plate also may include at least one sound absorbing layer on opposing sides of the SIC barrier layer. Preferably, the predetermined distance is calculated in consideration of a sound transmission class (STC) and a noise reduction coefficient (NRC) rating of the sound absorbing material, a thickness of the sound-absorbing material or both.

In a variation, the working unit or structure, and therefore, the at least one sound-emitting or sound-transferring opening is located in a ceiling, a wall or a floor, and wherein the sound absorbing muffler plate comprises a substantially planar portion from which side portions formed with the muffler plate extend vertically thereby forming a quasi-enclosure. The quasi-enclosure formed with the sound-absorbing muffler plate is moveable towards and away from the sound-emitting or sound-transferring opening in the ceiling, the wall or the floor. In one form, the working unit or structure is a packaged terminal air conditioning (PTAC) unit, wherein the quasi-enclosure substantially surrounds the PTAC unit but for the aperture and wherein the aperture is arranged at a predetermined distance from an intake opening, an exhaust opening or both in the PTAC unit. In another form, the working, unit or structure is an air conditioning (AC) unit, wherein the quasi-enclosure substantially surrounds the AC unit on an inside portion of the AC unit but for the aperture and wherein the aperture is arranged at a predetermined distance from an exhaust opening of AC unit.

In another embodiment, the noise attenuation system comprises an enclosure configured to substantially surround at least one sound-emitting or sound-transferring opening in a door to a volume in which noise-generating mechanical equipment is positioned, and to inhibit a direct acoustic path of sound emitted from the sound-emitting or sound-transferring opening in the door, into a room or space in order that sound detected at the door does not exceed a predetermined, sound level for the room or space. Therein, the enclosure comprises a sound absorbing muffler plate that covers the at least one sound-emitting or sound-transferring opening in the door to inhibit sound emitted from the noise generating mechanical equipment from emanating from the volume into the room or space. An aperture is formed in the sound-absorbing muffler plate at a predetermined distance from a location of the at least one sound-emitting or sound-transferring opening in the door, wherein the sound emitted from or entering the sound-emitting or sound-transferring opening travels along the predetermined distance of the sound-absorbing muffler plate to the aperture, during which travel sound is absorbed, so that the sound detected outside the room does not exceed the predetermined level sound.

In another embodiment, the invention provides a noise attenuation system comprising an enclosure configured to substantially surround at least one sound-emitting or sound transferring opening in a toe kicker opening or a HVAC grill on a floor, attached to a duct under the floor, to inhibit a direct acoustic path of sound emitted from or entering into the sound-emitting or sound-transferring opening, from or into the toe kicker opening or duct grill and duct in order that sound detected at the toe kicker opening or a HVAC grill on a floor does not exceed a predetermined level.

The enclosure comprises a sound absorbing muffler plate the covers the at least one sound-emitting or sound-transferring opening in the toe kicker opening or a HVAC grill on a floor to inhibit sound from emanating from the toe kicker opening or a HVAC grill on a floor into the room or space. An aperture is formed in the sound-absorbing muffler plate at a predetermined distance from a location of the at least one sound-emitting or sound-transferring opening in the toe kicker opening or a HVAC grill on a floor, wherein, the sound emitted from or entering the sound-emitting or sound-transferring opening travels along the predetermined distance of the sound-absorbing muffler plate to the aperture, during which travel sound is absorbed, so that the sound detected outside the toe kicker opening or a HVAC grill on a floor does not exceed the predetermined level sound.

In another embodiment, the invention provides an inverted rugged noise muffler system configured to substantially surround one or more sound-emitting or transferring openings in a working unit or structure, to absorb sound emitted from or into the sound-emitting or sound-transferring openings in order that sound detected on one side or another at the working unit or structure does not exceed a predetermined level, whether that is a specific sound pressure level (SPL) or designed to meet noise criteria (NC).

The system includes at least one barrier formed as a housing to cover one of the sound emitting or transferring openings of the working unit or structure, to inhibit sound from emanating from or into the housing, except at one or more barrier openings. The housing is movable into open or closed positions and is constructed to withstand compressive forces. At least one of the barrier openings is positioned at one or more housing ends to facilitate, a free exchange of gases and has a predefined length from the sound emitting or transferring openings in the working unit or structure to the first barrier opening. The inner surfaces of the housing plate are lined with at least one layer of sound absorbing material to, absorb the sound emitted from or into the sound emitting or transferring openings as the sound travels the predefined length of the housing. Preferably, the exterior of the housing of the rugged noise muffler system is made of perforated or solid metal, depending on whether the exterior is intended to absorb or not.

For that matter, the housing of the inverted rugged noise muffler system sufficiently surrounds an AC unit or HVAC unit in the wall or ceiling. In addition, or alternatively, the housing of the rugged noise muffler system sufficiently surrounds a door opening to a mechanical room (either inside or outside of the door) to reduce mechanical noise from exiting the mechanical room. And preferably, the housing of the rugged noise muffler system sufficiently surrounds a toe kicker opening or just a HVAC duct grill on a floor where the mechanical sounds from a floor diffuser are disturbing to the room the duct feeds, or the sounds within or outside of the room that the aperture feeds need to be reduced in intensity, so as to not be disturbing.

BRIEF DESCRIPTION OF THE DRAWINGS

The invention will be described in conjunction with the following drawings in which like reference numerals designate like elements and wherein:

FIG. 10 presents an embodiment of the rugged noise muffler system proximate an above ground unit that includes at least two exhaust and/or intake openings that emit noise that is attenuated by the system;

FIG. 12 depicts a side view of one embodiment of the inventive system comprising three components for attenuating noise emanating from an intake cover, a small exhaust cover and an exhaust cover of a unit;

DETAILED DESCRIPTION OF THE INVENTION

The following is a detailed description of example embodiments of the invention depicted in the accompanying drawings. The example embodiments are presented in such detail as to clearly communicate the invention and are designed to make such, embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
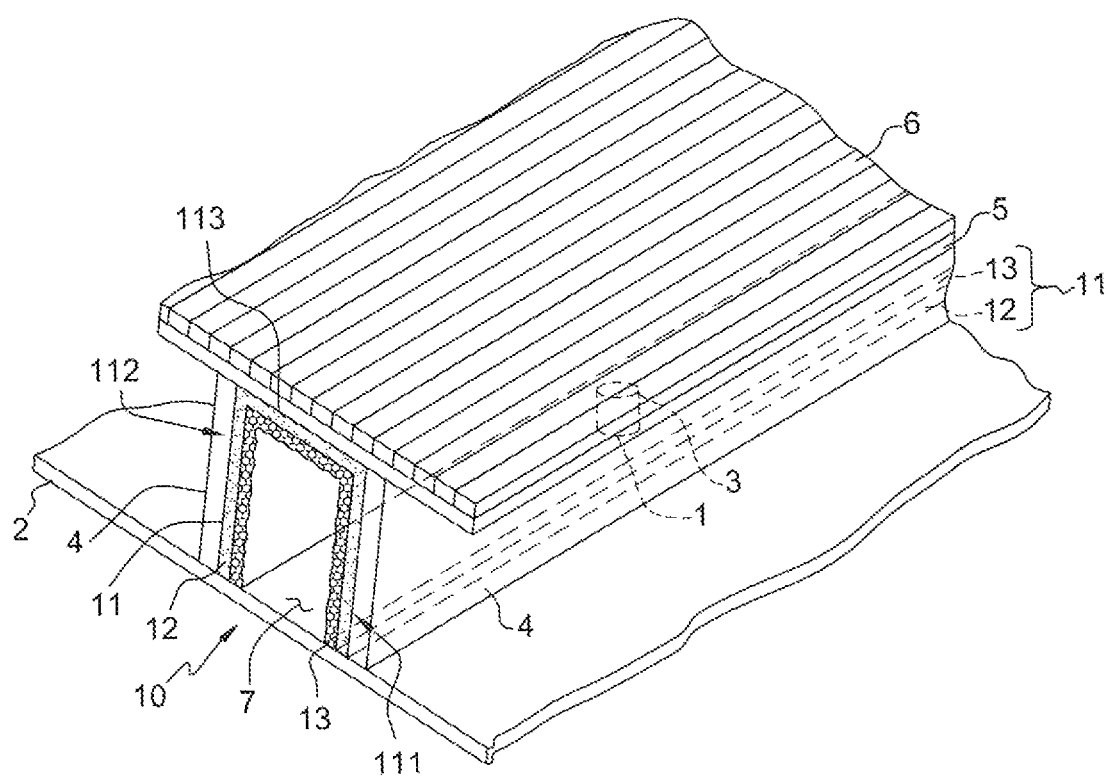
FIG. 1 is a perspective view illustrating the noise attenuation system in accordance, with an embodiment of the present invention whereby the noise attenuation system is positioned between upper and lower floors.
Figure 2:
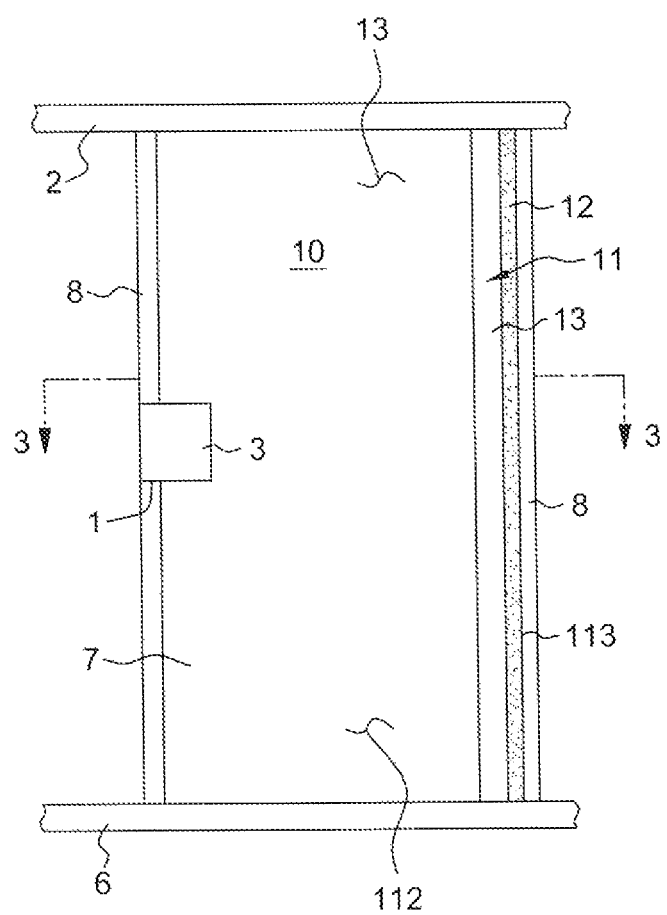
FIG. 2 is a partial side cross-sectional view of the noise attenuation system in accordance with the present invention positioned between adjoining walls.
Figure 3:
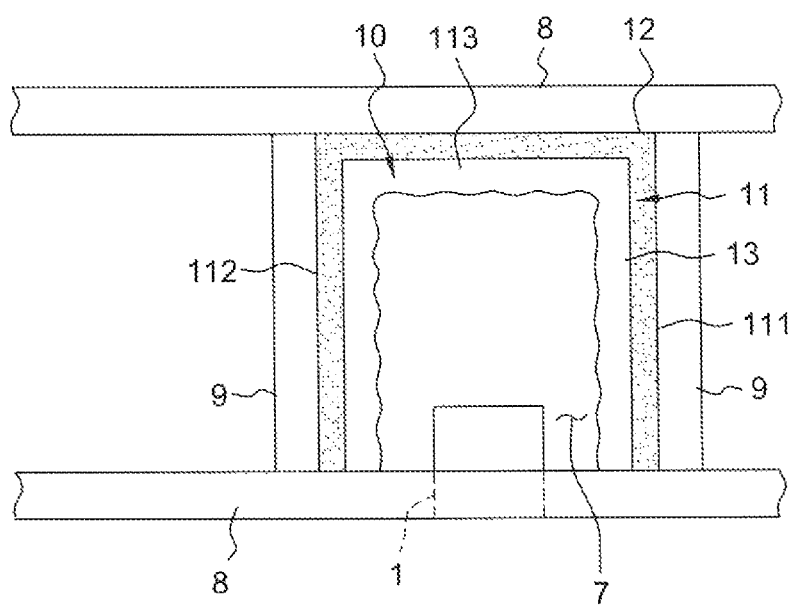
FIG. 3 is a cross-sectional view of the noise attenuation system taken along the 3-3 line in FIG. 2.

A system 10 for attenuating noise will now be described in greater detail in connection with FIGS. 1-4. For purpose of illustration, the system 10 for attenuating noise will be described in connection with the attenuation of noise associated with an opening 1 formed in a ceiling 2 for receipt of a mechanism 3, as illustrated in FIG. 1. The noise attenuation system 10 can also be used to attenuate noise associated with an opening formed in a wall 8, as shown in FIGS. 2 and 3. In accordance with the present invention, the mechanism 3 can be a recessed light fixture or any component that is recessed in a wall or ceiling including but not limited to electric outlet boxes, speakers, intercoms, exhaust fans, electrical heaters, video equipment including cameras and monitors and the like. Typically, the mechanism 3 is positioned between a pair of joists 4 or wall studs 9. The joists 4 or studs 9 can be located between wall 8, as shown in FIGS. 2 and 3, or between the ceiling 2 and the subfloor 5, as shown in FIG. 1. The mechanism 3 can be mounted to one or both of the joists 4. It is also contemplated that the mechanism 3 can be solely supported by the ceiling 2, wall 8 or by a bracket (not shown) connected to one or more of the joists 4, the studs 9, wall 8 or the subfloor 5. The ceiling 2 of the room or space is attached to the lower side of joists 4. The subfloor 5 of the upper floor of an upper room is attached to the upper side of the joists 4. A flooring material 6 is then secured to the subfloor 5. In a wall installation, the walls 8 are connected to the sides of the studs 9.

In order to improve the transmission loss of noise between the ceiling 2 and the subfloor 5 and flooring material 6 or the walls 8, the noise attenuating system 10 includes a noise muffler 11 that is located in the area 7 surrounding, but usually not contacting the mechanism 3, as shown in FIGS. 1-3. The noise muffler 11 includes, an outer barrier layer 12. The barrier layer 12 can be formed from a material, with a high STC barrier. The barrier layer 12 can be formed of a loaded vinyl (e.g., a one pound per square foot loaded vinyl). The barrier layer 12 can be formed from a material having an STC rating that is equal to or greater than the STC rating of the wall 8, floor 5, 6 or ceiling 2 when measured without the opening 1. Additionally, the material forming the barrier layer 12 can be a non-rigid material such that the layer 12 can be molded, shaped or manipulated to conform to the joists 4 and subfloor 5 or wall 8 in the vicinity of area 7. A more rigid form of the material can also be used when providing noise attenuation in an area having predetermined dimensions. The barrier layer 12 has a suitable STC rating such that any noise emitted from the mechanism 3 in the area substantially remains in the area 7 while the sound waves travel within the muffler 11.

Figure 5:
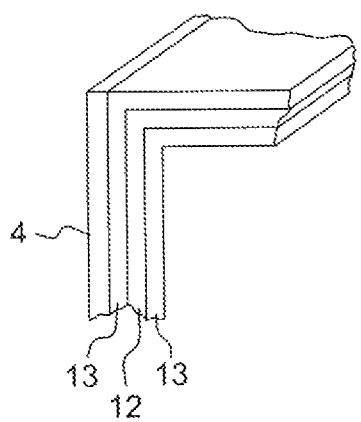
FIG. 5 is a partial perspective view illustrating a variation of the noise attenuation system in accordance with the present invention.

The noise muffler 11 further includes a noise absorbing layer 13, which is attached to or lines at least one side of the barrier layer 12, as shown in FIGS. 1 and 2. As shown in FIG. 5, the noise muffler 11 can include a pair of noise absorbing layers 13, which are located on opposing sides of the barrier layer 12. The second noise absorbing layer can function as a decoupler for potential low frequency noises. The sound waves emitted from the mechanism 3 are absorbed by the noise absorbing layer 13 before it exits the muffler 11. With such a construction, a suitable transmission loss is achieved. The noise absorbing layer 13 is preferably a high NRC rated material, where "NRC" stands for noise reduction coefficient and represents the average amount of sound absorbed by the material. The NRC rating typically ranges from 0.01 to 1.0, NRC ratings above 1 (e.g., 1.03) are also possible. The higher the NRC rating, the greater the sound absorption. The noise absorbing layer 13 is chosen based upon the characteristics of the particular mechanism 3.

Various materials are contemplated. In particular, the material forming the layer 13 is chosen for its sound absorbing qualities and its ability to withstand any heat emitted from the mechanism 3. As such, the material forming layer 13 for noise attenuation of a recessed stereo speaker can differ from the material used for noise attenuation of a recessed lighting fixture 3. Fiberglass and glass wool are considered to be suitable materials for the noise absorbing layer 13 for their sound absorbing and fire resistant qualities. The layer 13 may also be formed from a closely woven textile-like material formed from any suitable material provided the material has suitable sound absorbing properties and withstands a predetermined temperature. Additionally, it is preferable that the noise absorbing layer 13 be formed from a class A fire rated material. A suitable adhesive can be used to secure the noise absorbing layer 13 to the barrier layer 12. When multiple noise absorbing layers 13 are provided (e.g., FIG. 5), the layers can be formed from either the same material or a different material. Alternatively, the noise absorbing layer 13 can be connected to the barrier layer 12 when the layers 12 and 13 are secured to the joists 4 or subfloor 5 using suitable fasteners (not shown).

In the case of the stereo speaker, it is not necessary that the layer 13 withstand higher temperatures; rather, it is important that the material have high noise or sound absorption qualities to absorb the noise emitted into the area 7 by the speaker that may be transmitted through the joists 4 and the subfloor 5 and floor 6 into adjacent spaces. The barrier layer 12 will attenuate the noise that may be transmitted through the floor into the space above through the joists 4 and the ceiling 2, while the noise absorbing layer 13 will absorb noise emitted into the area 7 by the speaker. Furthermore, it is important that the material does not adversely affect the acoustic wave of the speaker for the desired sound to be emitted into the space.

In contrast, the material for the layer 13 used in connection with a recessed lighting fixture must be able to withstand higher temperatures emitted from the mechanism 3. The noise absorbing qualities of the material in this application are not as important because the barrier layer 12 will provide the primary noise attenuation. The muffler 11 can be sized to permit the dissipation of heat from the recessed fixture, if required.

As shown in FIGS. 1-3, the noise muffler 11 preferably includes sides 111 and 112, which extend along the joists 4 adjoining the area 7. An upper portion 113 is positioned adjacent the subfloor 5 (FIG. 1) or wall 8 (FIG. 3). The noise muffler 11 is preferably formed with open ends to permit venting. The noise muffler 11 can also include ends, not shown, when heat venting is not required such as for speaker enclosures and electric outlets, which extend between the joists 4 from the subfloors 5 to the ceiling. The ends, however, are not necessary if the length of the muffler is long enough, because the noise absorbing layer 13 substantially absorbs the sound waves before the sound waves can exit the ends of the muffler 11. The muffler 11 can provide a noise absorbing barrier having an STC rating that is equal to or greater than the ceiling and surrounding structure or wall and surrounding structure depending on the placement of the mechanism 3. As an example, the muffler 11 would travel from the ceiling up the joist 4 along the subfloor 5 above and down the other joist 4 to the ceiling 2 attached to the adjacent joist 4. As shown in FIG. 1, the muffler 11 surrounds the mechanism 3. The muffler 11 is intended to contain the noise generated from the mechanism 3 and/or transmitted through the walls, ceilings, joists, studs and floors of adjacent spaces thus creating a situation where the energy of the acoustic wave is forced to travel through the muffler 11. The muffler 11 is sized such that as the sound waves travel within the muffler 11, the sound waves are substantially absorbed by the layer 13 such that the noise is absorbed by the layer 13 before exiting the muffler 11.

The size of the muffler 11 may vary according to the particular noise attenuation application. The size of the muffler 11 is determined based upon several parameters including, but not limited to the heat generated from the mechanism 3 such that proper ventilation can be provided, the frequency of the noise to be contained by the muffler 11, the amount of transmission loss required, and the material used to form the layer 13. The number of fixtures 3 placed in a particular area will also impact the size of the muffler 11. For example, the number of recessed lights which may be located in a linear arrangement such that they are positioned between the same two joists 4 will impact the size of the muffler 11. The muffler 11 may be sized to extend the length of the joists 4 such that a single muffler 11 is provided for noise attenuation and proper ventilation.

Whatever the absorbing material chosen for the layer 13, it will attenuate the acoustic energy of the noise source (i.e., the fixture 13). Since absorbers have a known noise absorption in a specific frequency, the length of the muffler 11 is to be governed by the frequency of concern and the material used. The length is determined such that the noise emitted from the mechanism 3 is substantially absorbed by the muffler 11 before exiting the muffler 11. Any remaining sound waves are absorbed or reduced by the surrounding structure (i.e., ceilings 2, wall 8 and joists 4 and any sound insulating materials located therein. As such, the STC rating of the structure containing the opening 1 with the mechanism 3 can be substantially the same as the structure without the opening 1 and the mechanism 3. The length of the noise muffler 11 can be determined based upon a determination of the wavelength λ of the noise. The wavelength λ is determined based upon the velocity of the sound waves $v_w$ and the frequency f of the noise where:

$$\lambda = v_w/f$$

Figure 4:
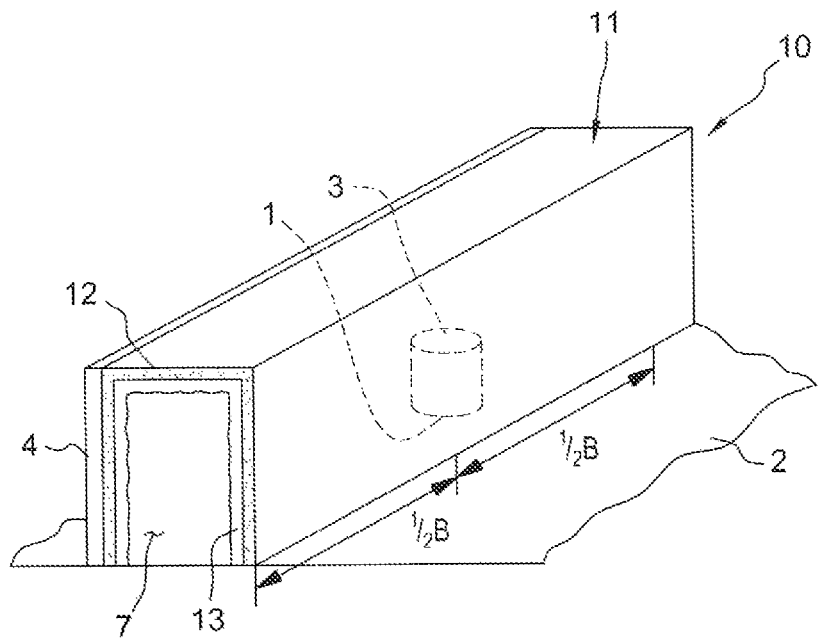
FIG. 4 is a perspective view illustrating the length of the noise attenuation system in accordance with the present invention.

As shown in FIG. 4, the minimum length of the muffler 11 is beta where:

$$\beta = 2\lambda/NRC$$

The NRC rating is, chosen based upon the material forming layer 13 at a given frequency f.

Example 1

The frequency f of concern is 500 Hz. The velocity of the sound wave $v_w$ is 1100 ft./sec. Using this information, the approximate desired length of the muffler 11 can be determined.

$$\lambda = (1100 \text{ ft./sec})/500 \text{ Hz} = 2.2 \text{ ft.}$$

The NRC coefficient for a material for using in absorbing sound waves with a frequency f of 500 Hz is 0.85.

$$\beta = 2\lambda/NRC = 2(2.2 \text{ ft})/0.85 = 5.2 \text{ ft.}$$

The minimum length of the muffler 11 is approximately 5.2 ft. with the mechanism 3 being located approximately in the center of the muffler 11 (i.e., ½β as shown in FIG. 4). This determined minimum length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

Example 2

The frequency f of concern is 125 Hz. The velocity of the sound wave $v_w$ is 1000 ft./sec. Using this information, the approximate length of the muffler 11 can be determined.

$$\lambda = (1100 \text{ ft./sec})/125 \text{ Hz} = 8.8 \text{ ft.}$$

The NRC coefficient for a material for using in absorbing sound waves with a frequency f of 125 Hz is 0.65.

$$\beta = 2\lambda/NRC = 2(8.8 \text{ ft.})/0.65 = 27 \text{ ft.}$$

The minimum length of the muffler 11 is approximately 27 ft. with the mechanism 3 being located approximately in the center of the muffler 11 (i.e., ½β as shown in FIG. 4). This determined length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

It is intended that the noise attenuation system 10 in accordance with the present invention may be installed during the construction phase of the structure or as a retrofit after construction, but during the installation of the fixtures 3 during for example a home or office remodeling. The installation of the system 10 during a retrofit or remodel may require the removal of a least portion of the wall, or ceiling 2 to permit insertion of the muffler 3.

Additionally, any insulation located between the joists 4 would also have to be removed in the area surrounding the mechanism 3, if heat ventilation is required.

While the above-described embodiments show system 10 are described in connection with the attenuation of noise associated with an opening 1 formed in a ceiling 2 or wall 8 for receipt of a mechanism 3 (FIG. 1-5), FIGS. 6A, 6B and 7A-7C depict a noise attenuation system 10' that comprising a muffler 11' that is not required (but may be) directly mounted in a wall or ceiling. Noise muffler 11' is instead constructed to receive a mechanism 3 in an open cavity 110 formed with 5 sides (bottom 122, front end 123, rear end 124, left side 125 and right side 126), where at least one of the front and rear ends 123, 124 or, the left and right sides 125, 126 is partially open. The size of the opening (or openings where both sides or ends are partially open) is adjustable in an amount required by the nature of the mechanism 3 to be surrounded thereby.

The overall size of the muffler 11' may vary according to the size of the particular mechanism 3 for which it is to substantially enclose, as well as the heat generated from the mechanism 3. For that matter, each of the front end 123, rear end 124, left side 125 and right side 126 include respective flaps 123a, 124a, 125a and 126a, attached and extending along the side ends opposing the side ends that connect to the 4 bottom ends. The flaps 123a, 124a, 125a and 126a pivot, due to the flexibility of their nature, and the flexibility of their connection to the respective sides, almost 360° in order that they may be aligned in parallel with the sides, either inside or outside of the cavity 110. The muffler 11', therefor, operates like a pouch (a preferably rectangular pouch), with flaps. The flaps may be used to secure the muffler to a structure to which the mechanism is affixed, or to the structure itself, for example, by nailing, stapling, gluing, etc., without limitation.

Figure 6A:
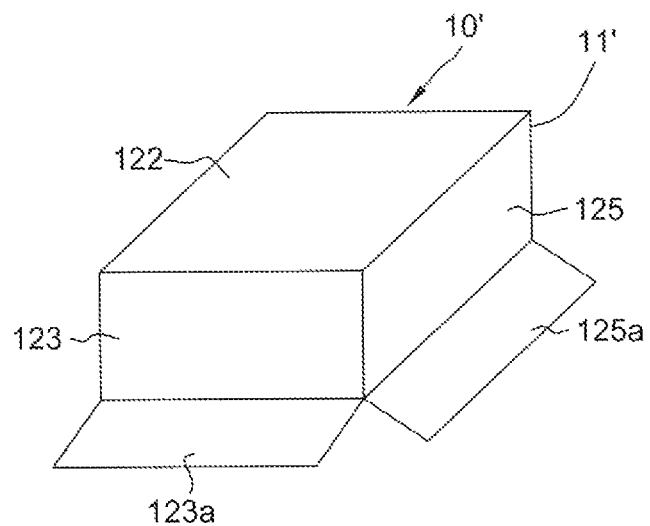
FIG. 6A is a schematic diagram depicting a side perspective view of the noise muffler of the invention.
Figure 6B:
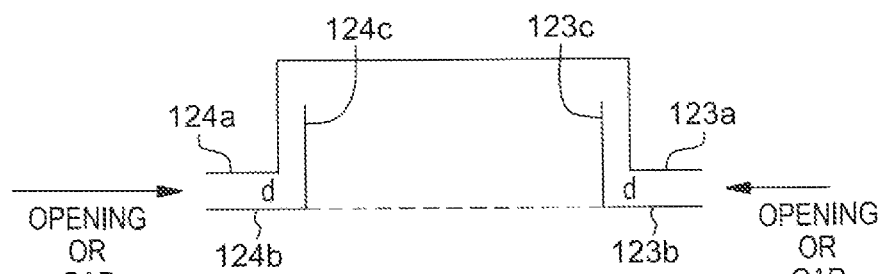
FIG. 6B is a schematic diagram depicting side cross-sectional view of the noise muffler of FIG. 6A.
Figure 7A:
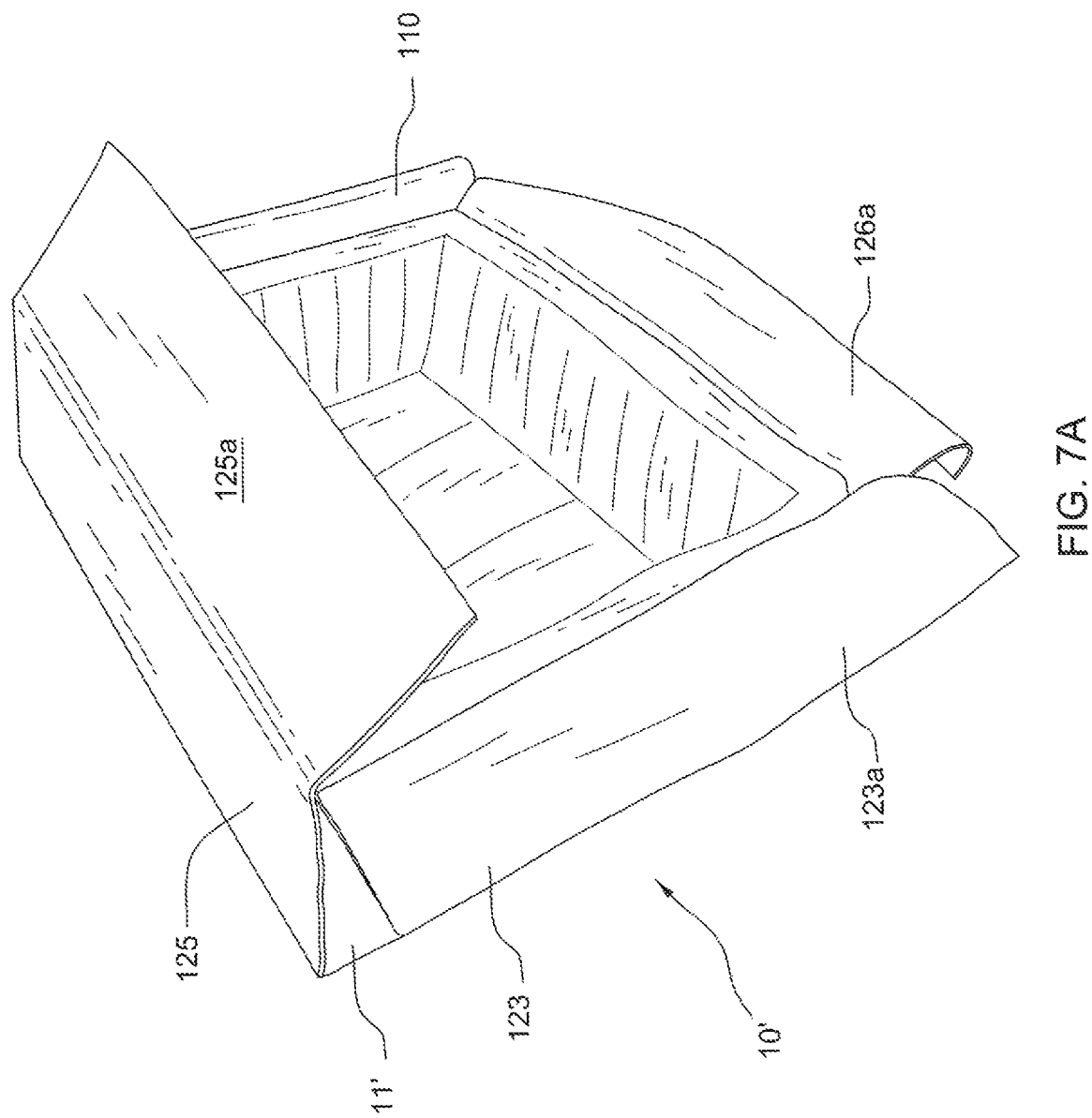
FIG. 7A is a perspective view of another embodiment of the noise attenuation system of the invention, comprising a noise muffler for substantially completely surrounding and attenuating noise associated with a mechanism.
Figure 7B:
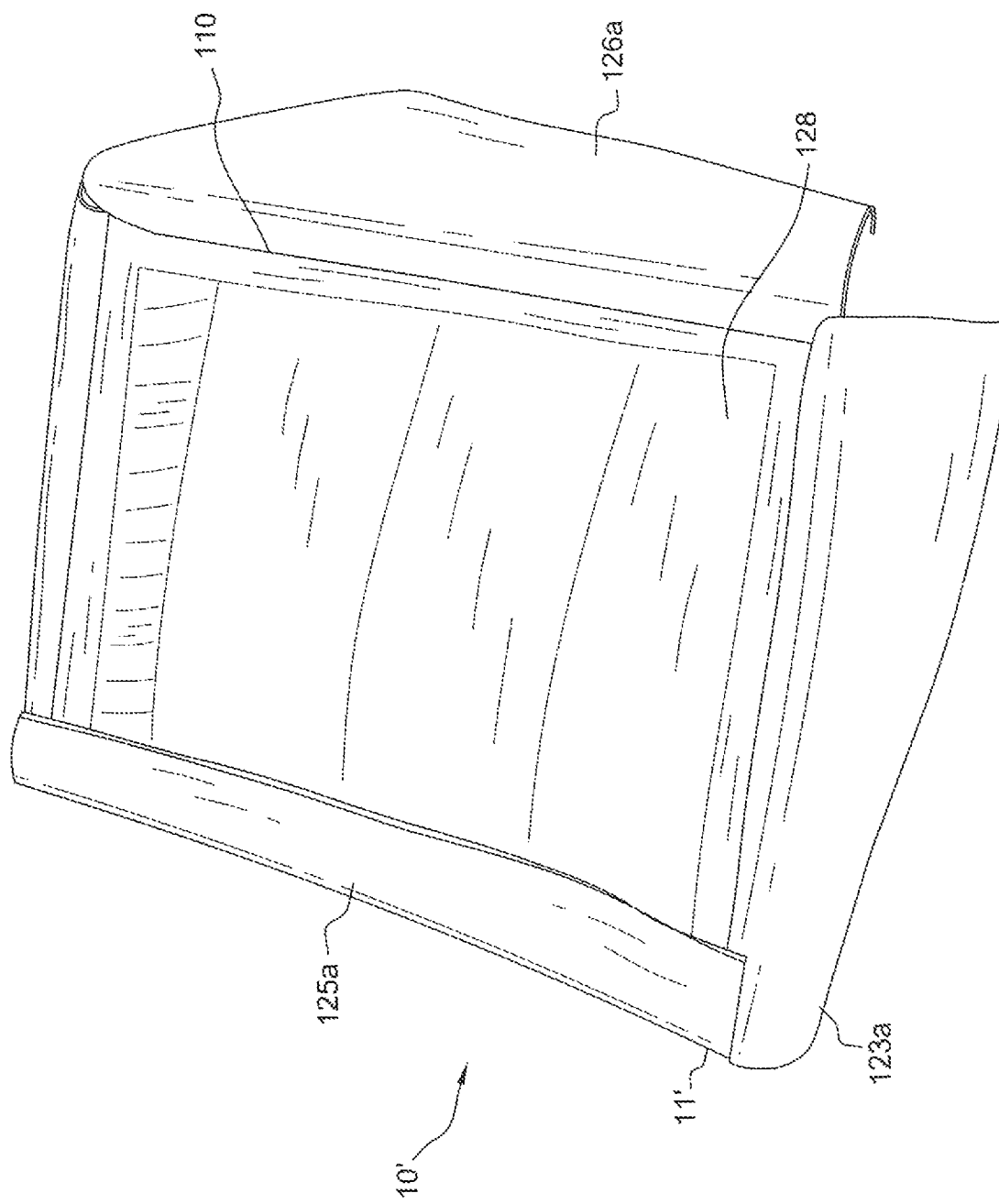
FIG. 7B is a top plan view looking into a cavity formed by the noise muffler construction of FIG. 7A.
Figure 7C:
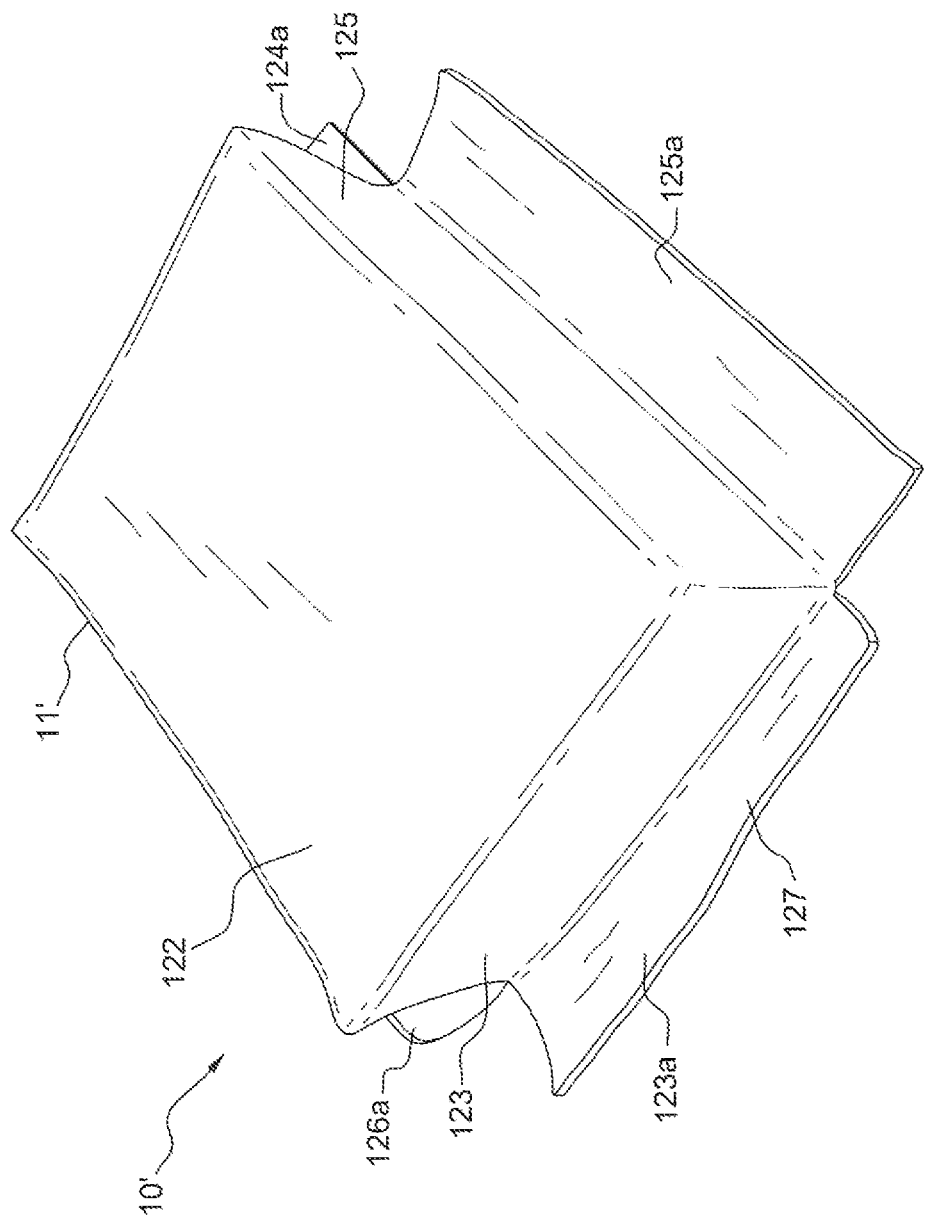
FIG. 7C is a bottom perspective view of the noise muffler of FIGS. 7A and 7B.

At least one of the front and rear ends 123, 124, or the left and right sides 125, 126 of the muffler 11' include an opening, the size of which is adjustable. FIG. 6B shows one exemplary embodiment where the opening is provided in rear end 124. The opening is created by including a second flap 124b separated from the first flap 124a by a gap, the second flap 124b arranged to extend horizontally (in FIG. 6B to highlight the gap or partial opening) to a second inner side wall 124c, between the inner surface of the rear end 124 and the inner volume of the cavity 110. The gap or partial opening between the inner surface of the rear end 124 and the inner volume of the cavity 110 extends to an opening into the inner volume of the cavity 110 (near the inner surface of bottom 122), essentially forming a "baffled" path for air flow, wires, etc., from outside the muffler 11' to the inner volume of the cavity 110 and of, course the mechanism substantially enclosed or to be substantially enclose therein.

By adjusting the positioning of the first flap 124 and the second flap 124a, and/or the length of the height or the rear end 124, the size of the opening or gap is adjustable. For example, where the mechanism 3 is a loud speaker, the size of the gap or opening may be minimal, as only minimal heat builds up in the inner volume of the muffler 11' during intended use. However, if the mechanism is a light or other mechanism that generates a fair amount of heat in normal use, the gap or opening must be substantially larger, in worst case circumstance being an entirely open end. Likewise, the opposing or front end 123 may include a second flap 123*b* and inner wall 123*c*, that enable adjust the size of an opening or gap at the other end. The reader should note that the gaps or openings are not limited to being provided in the front end, the rear end or both, but me be positioned in additionally or replacedly in at least one or both of the left 125 and right 126 sides, without deviating from the scope and spirit of the invention.

In order to improve the transmission loss of noise generated by a mechanism inside the cavity 110, all 5 sides (bottom 122, front end 123, rear end 124, left side 125 and right side 126) of the noise muffler 11' include an outer barrier layer 127. The outer barrier layer 127 can be formed from a material, with a high STC barrier, for example, formed of a loaded vinyl (e.g., a one pound per square foot loaded vinyl). Additionally, the material forming the barrier layer 127 can be a non-rigid material such that the layer 127 can be molded, shaped or manipulated to conform to any location at which the mechanism is to be or is positioned. A more rigid form of the material can also be used when providing noise attenuation in an area having predetermined dimensions.

The noise muffler 11' further includes a noise absorbing layer 13, which is attached to or lines at least one (but preferably all 5) sides (bottom 122, front end 123, rear end 124, left side 125 and right side 126) of the muffler 11'. For that matter, while not expressly shown in FIGS. 6A, 6B, 7A, 7B and 7C, the noise muffler 11' can include a pair of noise absorbing layers 13, which are located on opposing sides of the barrier layer 12. The second noise absorbing layer can function as a decoupier for potential low frequency noises. The sound waves emitted from the mechanism 3 are absorbed by the noise absorbing layer 13 before it exits the muffler 11'. With such a construction, a suitable transmission loss is achieved. The noise absorbing layer 13 is preferably a high NRC rated material, where "NRC" stands for noise reduction coefficient and represents the average amount of sound absorbed by the material. The noise absorbing layer 13 is chosen based upon the characteristics of the particular mechanism 3.

Various materials are contemplated. In particular, the material forming the layer 13 is chosen for its sound absorbing qualities and its ability to withstand any heat emitted from the mechanism 3. As such, the material forming layer 13 for noise attenuation of a recessed stereo speaker can differ from the material used for noise attenuation of a recessed lighting fixture 3. Fiberglass and glass wool are considered to be suitable materials for the noise absorbing layer 13 for their sound absorbing and fire resistant qualities. The layer 13 may also be formed from a closely woven textile-like material formed from any suitable material provided the material has suitable sound absorbing properties and withstands a predetermined temperature.

Additionally, it is preferable that the noise absorbing layer 13 be formed from a class A fire rated material. A suitable adhesive or a fastener that is secured in way as to include a sealant or a piece of hardware designed, to create a seal, such as a fender washer, can be used to secure the noise absorbing layer 13 to the barrier layer 12. When multiple noise absorbing layers 13 are provided, the layers can be formed from either the same material or a different material. In the case of the stereo speaker, it is not necessary that the layer 13 withstand higher temperatures; rather, it is important that the material have high noise or sound absorption qualities to absorb the noise emitted by the speaker. The barrier layer 12 will attenuate the noise that may be transmitted from the back of the speaker (or other mechanism), while the noise absorbing layer 13 will absorb noise emitted by the speaker. Furthermore, it, is important that the material does not adversely affect the acoustic grave of the speaker for the desired sound to be emitted into the space.

In contrast, the material for the layer 13 used in connection with a recessed lighting fixture must be able to withstand higher temperatures emitted from the mechanism 3. The noise absorbing qualities of the material in this application are not as important because the barrier layer 12 will provide the primary noise attenuation. The muffler 11' can be sized to permit the dissipation of heat from the recessed fixture, if required.

It will be appreciated that numerous modifications to and departures from the preferred embodiments described above will occur to those having skill in the art. The present invention is not intended to be limited to sound insulation between the floor and ceiling of a structure, rather, the system 10 can be used between walls or in any structure where sound insulation is desired.

Furthermore, the terminology fixture is not intended to be limited to recessed lighting; rather, the terminology fixture may include any component that may be mounted in a recess or hole in a wall, ceiling or other structure. Furthermore, the muffler 11 can be used in any application where it is desirable to increase transmission loss through the recessed fixture and/or provided ventilation of the recessed fixture to permit dissipation of heat from the recessed fixture when necessary, or just an opening for such items as extensive wiring. It is also contemplated that the noise absorbing layer 13 can be formed from one or more layers which together form the layer 13. Thus, it is intended that the present invention covers the modifications and variations of the invention, provided they come within the scope of the appended claims and their equivalents.

The invention also provides a rugged noise attenuating system for use in protecting and attenuating sound emitted from structures or units that have at least one noise emitting portion, or opening exposed to the environment (i.e., the outdoors). Such structures are typically positioned on the ground or include a portion with a sound emitting source rising out of the ground or ground enclosure, for example, a housing associated with a cellular tower, vents, exhausts, access points, etc., for mechanical equipment installed in residential and commercial buildings, installed in or below in parking lots, proximate highways, bridges, unused land in close proximity to populated areas, etc.

The sources of emitted sound to be attenuated by the rugged noise attenuating system generally embody an opening in the structure for air intake or exhaust, where noise escapes with the exhaust and/or intake into the environment. As some blowers, compressors, etc. are quite loud, the rugged noise attenuation system is configured to envelop and cover the structure or portion with the opening, protecting the fixture, unit, mechanism or portion while attenuating the sound (i.e., noise) that might normally be released into the environment.

Inventive embodiments, therefore, embody a rugged noise attenuation or muffler system including one or multiple noise absorbing mufflers constructed according to the details set forth hereinbelow. The one or multiple noise absorbing mufflers are then positioned upon a structure or unit, or to enclose the structure or unit to attenuate noise emanating therefrom, and preferably, constructed to protect the structure physically from any damage that could occur by contact from cars, trucks, etc.

Figure 8:
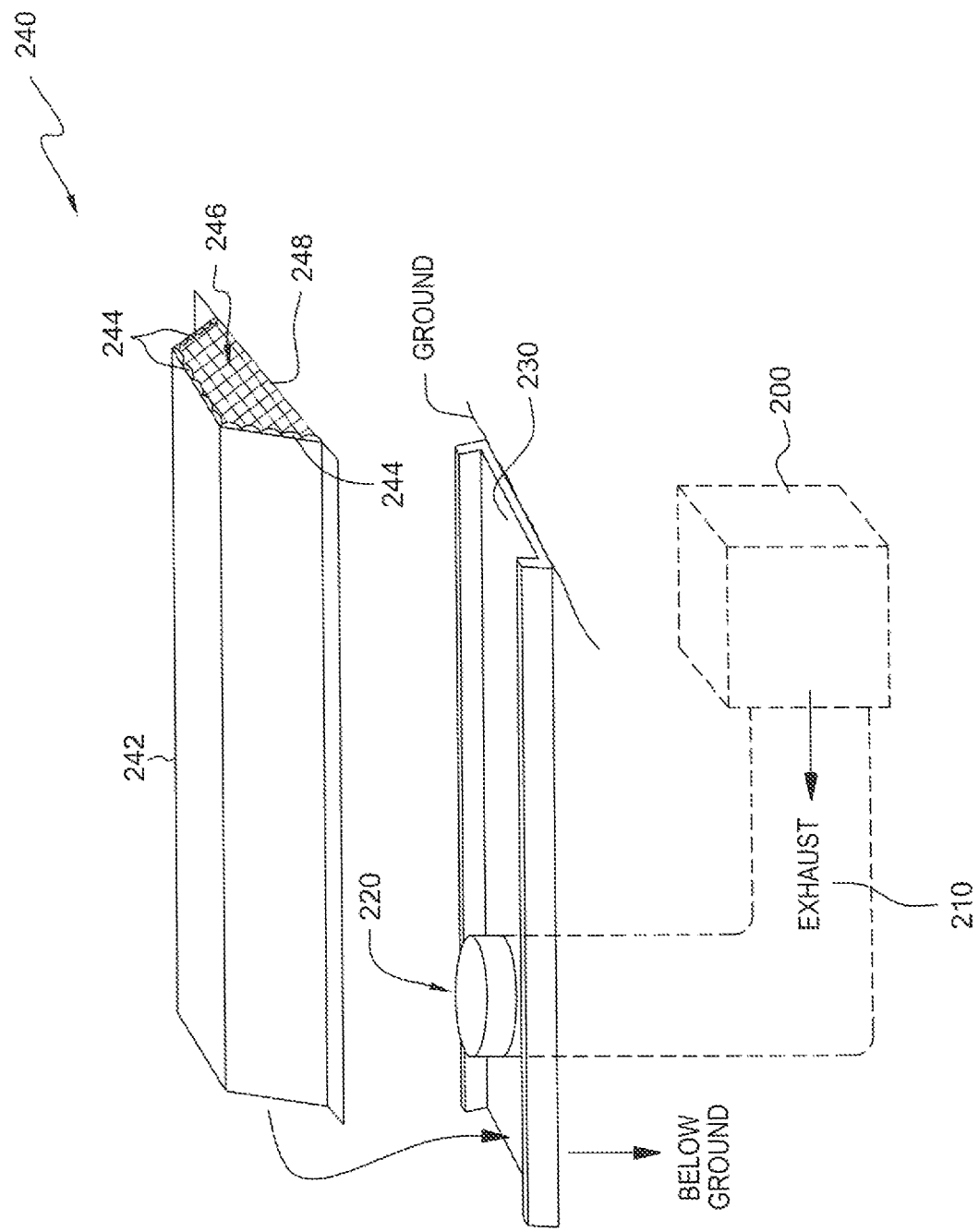
FIG. 8 depicts an embodiment of a rugged noise muffler system proximate an opening in an underground unit from which emitted noise is attenuated.

FIG. 8 depicts an underground unit 200 (e.g., a condenser, blower, etc.), from which extends an exhaust duct(s) 210 (also underground) that operates as an channel to an aboveground opening or vent, covered by a collar 220 to prevent water, etc., from entering the duct(s). Such an arrangement typically includes a concrete slab 230 at ground level, through which the duct extends to the collar and under which the underground unit 200 is positioned, but not always. A rugged muffler system 240 of the invention is disposed on the concrete slab 230 in order to cover and insulate the collar 220 from the environment, to suppress noise emanating from the unit 200, particularly at collar 220, and protecting the unit and/or the collar 220 from damage that could result from accidental or intentional mechanical forces applied thereon. For that matter, the rugged muffler system 240 may be used to cover not only an exhaust opening, such as that covered by collar 240, but intake openings and emergency exhaust and/or intake openings, realizing a multicomponent rugged muffler system. The barrier 242 as shown is substantially trapezoidal shaped, with side flanges extending away from the sides where same contacts the ground, as shown.

The rugged muffler system 240 comprises a barrier 242 that is preferably metal, such as steel, and lined on at least one inside surface with sound insulating or absorbing material 244 (seen on the side of the barrier). A large portion of the sound emanating from the vent or collar 220 will come into contact with an inner surface of the barrier 242, and the sound absorbing material 244. The sound is prevented from passing from inside a volume that is substantially enclosed by the barrier, through the barrier wall, to outside the volume. Parts of the sound that are not absorbed directly by the sound absorbing material travel laterally towards the single opening 246 (as shown in FIG. 8), where portions if not all are absorbed by contact with further sound absorbing material and the ground (or slab).

The noise absorbing layer may be formed from a class A fire rated material. A suitable adhesive or a fastener that is secured in way as to include a sealant or a piece of hardware designed to create a seal, such as a fender washer, can be used to secure the noise absorbing layer to the barrier. In a variation, the barrier might include multiple noise absorbing layers, which can be formed from either the same material or a different material.

In a preferred embodiment, the sound absorbing material 244 is QB12 sound insulating material. QB12 is an absorber/barrier composite comprising sound absorbing/barrier composite acoustic rated material made available as a commercial product, by SoundSense, Wainscoft, N.Y. The STC of the absorber identified as sound absorbing/barrier material 244 (as well as the length of the channel through which the sound to be absorbed is forced to traverse) must be determined for any particular application in view of the length of the barrier 242 and/or the distance from the sound source to the rugged muffler opening or openings.

Please note that while the perspective view of FIG. 8 only shows a small part of the inside of the barrier 242, including the sound absorbing or attenuating material, the material fully lined the entire vertical and horizontal inside surfaces. Typically, a lower or bottom barrier surface is not required to effectively protect the units and structures, because, as mentioned above, the ground or even a concrete slab is a good sink for sound energy. That is, the ground operates to absorb sound energy that strikes it in its tortuous path from the sound emitting opening in a unit to be protected to a barrier opening (246). But where a barrier bottom surface is included for a particular application, particularly in a case where the harrier is formed of a hard material such as metal, plastic, polyvinyl chloride (PVC), etc., such bottom is reflective wherefore an absorber needs to be added or, attached to the inner bottom surface.

Figure 9:
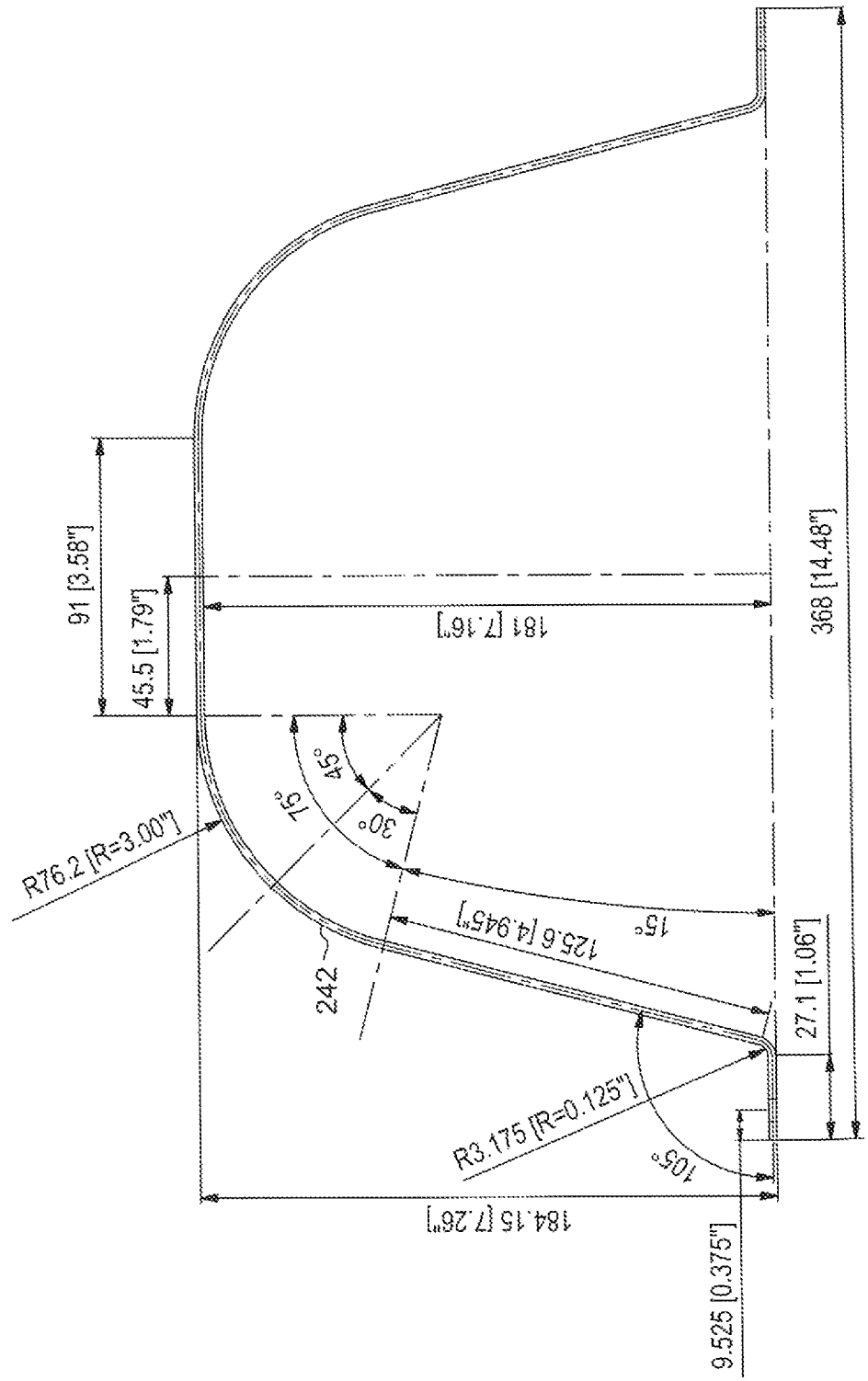
FIG. 9 presents a side view of embodiment of the rugged noise muffler system of FIG. 8.

Preferably, a screen 248 is included in the opening 246, to keep small anima insects and/or other debris out of the volume substantially surrounded by the barrier. FIG. 9 presents a side cross-sectional view of one embodiment of the barrier 242, which is made of metal or fiberglass (depending on need), including dimensions, but without sound absorbing material 244. While the barrier system 242 is depicted as including only one opening (on the right side of FIG. 8), a second, opening may be included to better facilitate gas exchange, where necessary.

In some applications, units to be protected by the rugged muffler system are substantially above ground structures, or partially above ground, and have more than one opening that functions as a source of unwanted sound. FIG. 10 presents an example of an above ground unit 202 that includes at least two exhaust and/or intake openings 202*a* and 202*b*, where only opening 202*a* is clearly seen in the figure and, an alternative rugged muffler system 250 provided to sound insulate noise emanating from above-ground unit 202.

Figure 11A:
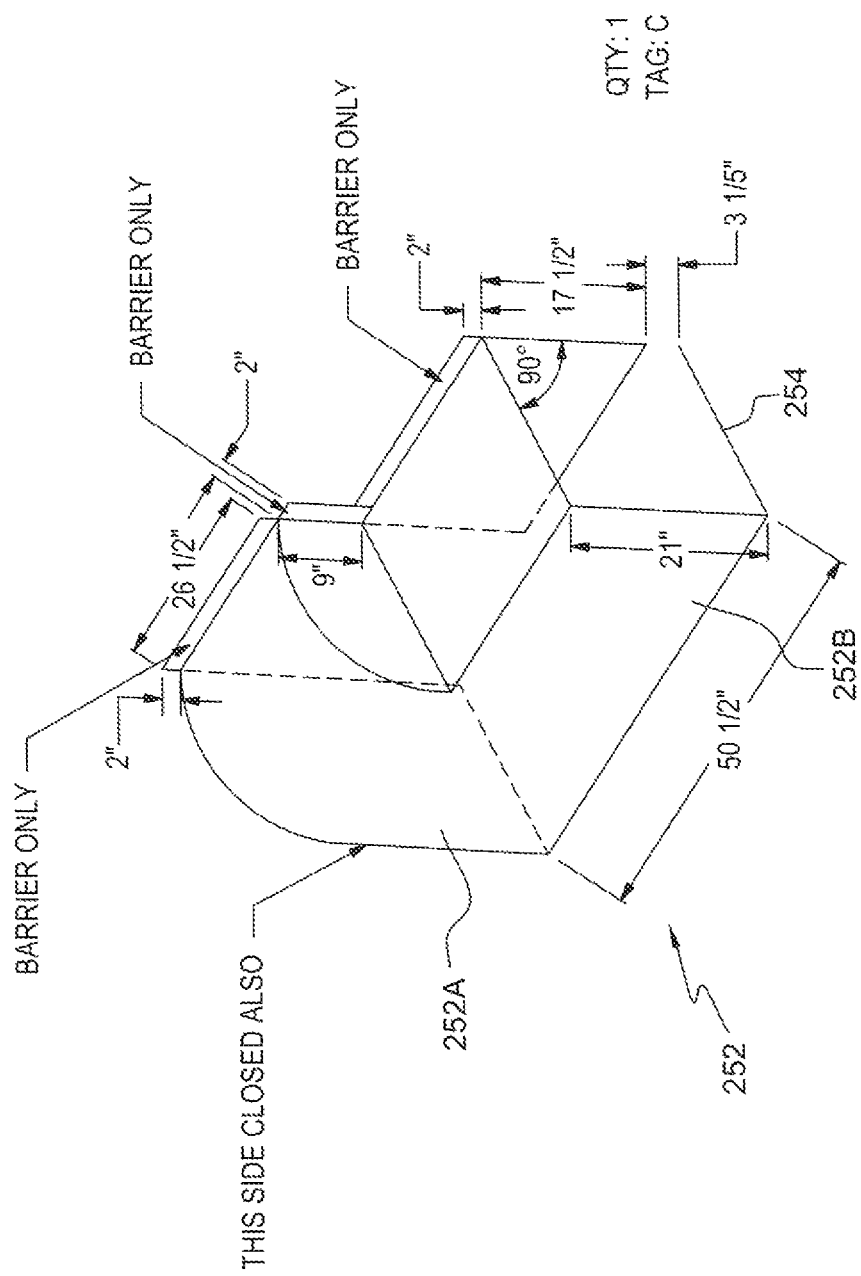
FIG. 11A depicts a barrier component of the system, which comprises a first hood portion and an elongate portion.
Figure 11B:
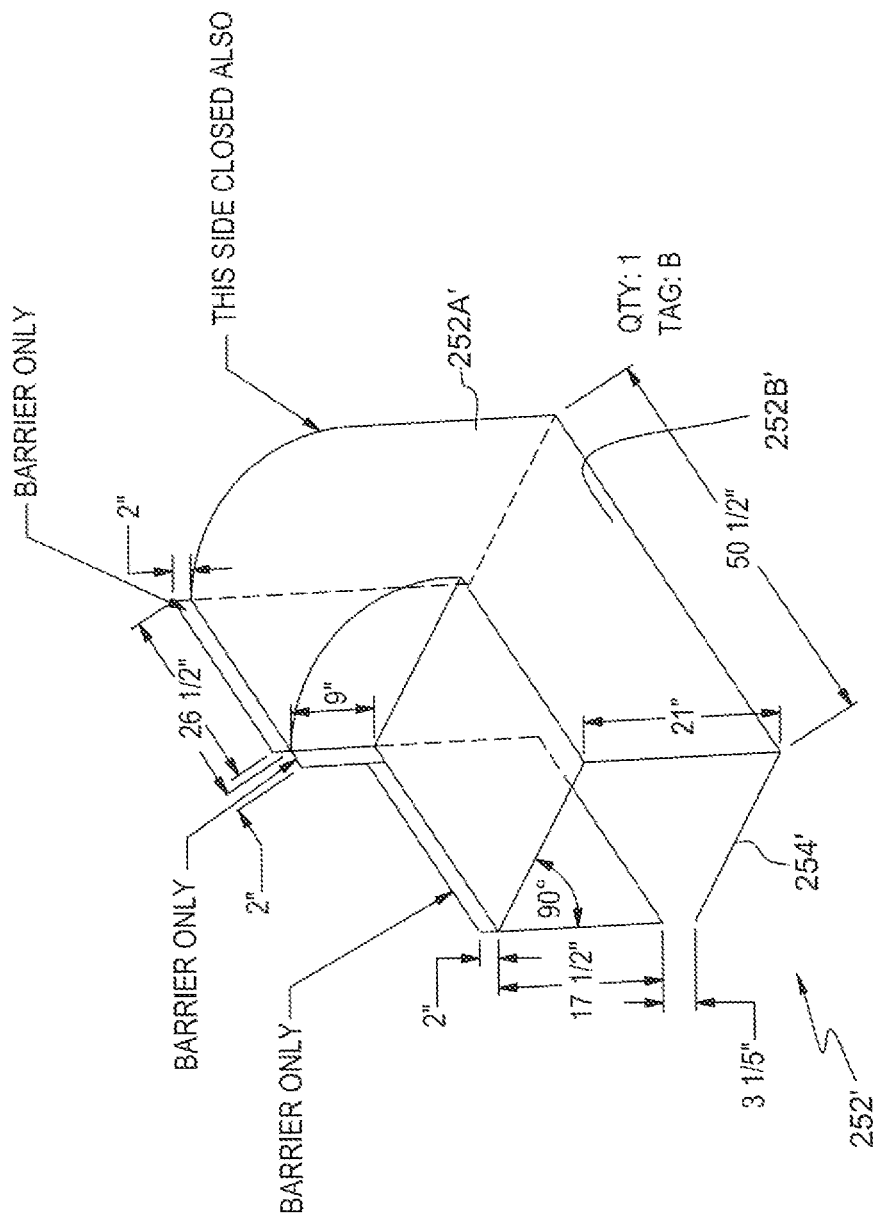
FIG. 11B depicts a barrier component of the system that is structurally a mirror image of the component shown in FIG. 11A.

Rugged muffler system 250, as shown, comprises two separate barrier components, a first barrier component 252 and a second barrier component 252'. These first and second barrier components (or barriers) are shown in detail in the manufacturer drawings of FIGS. 11A and 11B, respectively. That is, the first barrier component 252 comprises two contiguous portions, a hood portion 252A, and an elongate portion 252A. The second barrier component 252' is a mirror image of the first barrier component 252 (partially obscured in FIG. 10 but clearly shown in FIG. 118). Both the first and second barrier components 252, 252' include sound absorbing material 244 on at least one (and preferably all) of their inside surfaces and are open at the bottom. But please note that like the embodiment of FIGS. 8 and 9, a bottom surface may be included in certain applications, which is covered with sound absorbing material. Sound emanating from openings 202*a* and/or 202*b* of mechanical unit 202 comes into contact with the inner, noise-absorbing-material-lined surfaces of the hood portions 252A, 252A', respectively, and prevented from passing through the barrier. Part of the noise is absorbed in the hood portions, including by both the sound absorbing material and the ground thereunder.

Sound that is not absorbed in the hood portions 252A, 252A', then travels laterally away from the hood portions within the elongate portions 252B, 252B'. Any unabsorbed sound/noise leaving the hood portions is further attenuated by the sound absorbing material 244 and ground under the respective elongate portions, as it moves towards the openings. While designed with a length determined in view of the expected sound intensity, the lowest frequency of the unwanted sound and the STC of the sound absorbing material, little or no sound should be detected at the openings 254, 254'.

Figure 11C:
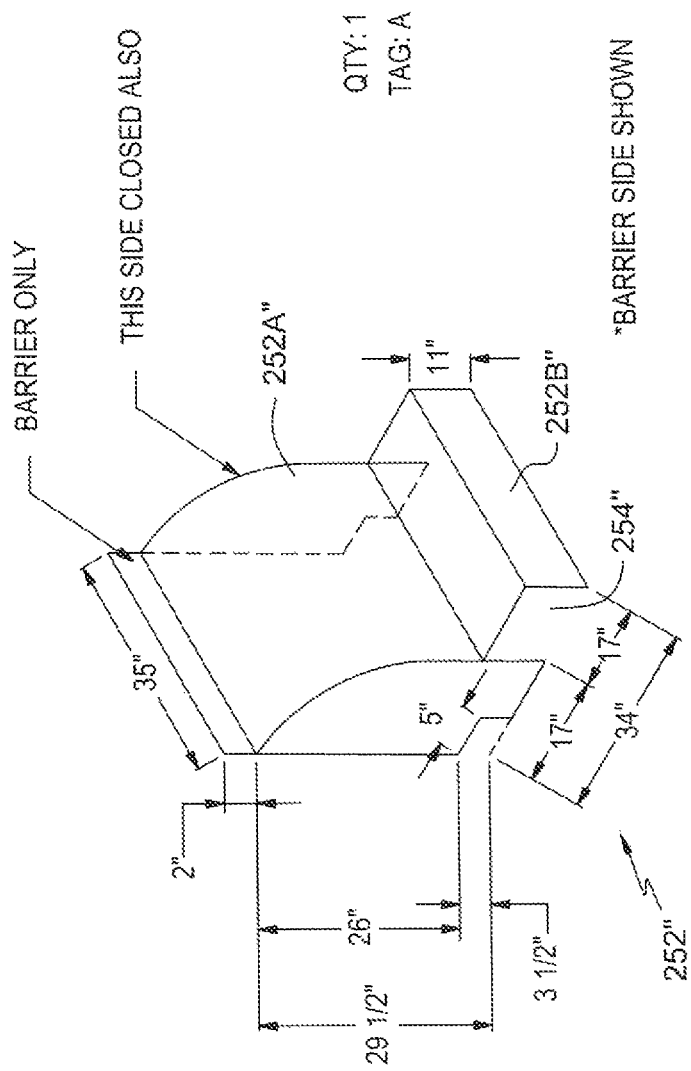
FIG. 11C depicts an alternative barrier component of the inventive system.

It should be noted that the physical shape and number of the muffler or barrier components may be varied as long as the final defined shape (particularly, the length), and the STC of the sound absorbing material 244 therein, to effectively reduce the sound radiating from the noise source openings in the unit 202. For that matter, FIG. 11C presents a manufacturing drawing of an alternative embodiment of a barrier or muffler portion 252" (including dimensions for one implementation), where the elongate component 252B" is formed as a quasi-step part of hood portion 252A" and extends contiguously therefrom. An exhaust opening 254" is shown close to the ground, at which gases are freely exchanged but where little or no noise should escape.

The opening 254" can be provided on the other side of the elongate portion 252B", depending on the location of the noise emitting source (not shown) relative the left or right side sides of the hood portion 252A". That is, it is preferable to maximize the distance the sound must travel from a source to an opening 254, 254', 254". The longer the distance, the more opportunity for the sound to be absorbed by the sound absorbing material and the ground (or ground structure). For that matter, while shown with only one opening 254, 254', 254", a second opening might be included opposite a first as required. While not shown in FIGS. 11A, 11B and 11C, the inside surface of each of the barrier structures are covered with an absorbing/barrier acoustic rated material, such as that of QB12.

In order to ensure that the barrier or barriers that are part of a rugged muffler system will effectively insulate sound from the unit or units to be protected, several steps are required. First, the lowest frequency sound that will radiate from the source(s) of sound (i.e., unit opening(s)), must be determined. This can be accomplished by use, for example, of a Larson Davis System precision sound level meter and a real-time frequency analyzer.

Then, the length of the barrier component (e.g., both the hood part and/or the elongate part 252B, 252B', 252B") that covers the sound emitting source, prevents the sound from passing through the barrier to the outside and absorbs the sound, must be determined, in view of the lowest anticipated frequency of the sound. Once the length is determined, the STC and NRC of the sound barrier/absorbing material sufficient to reduce the measured sound to the desired or acceptable sound level is determined. Once the material with the required STC and NRC rating is determined, the absorber material is applied to and affixed on all inside surfaces of each muffler or barrier component. As mentioned, where there is no bottom or ground-contacting surfaces, any sound waves striking the ground covered by the hood portion 252A and elongate portion 252B are attenuated at least in part; the non-absorbed part is reflected back or away.

In one application, the inventive rugged muffler system is used to quiet noise from a structure found at cellular tower equipment locations. That is, cellular towers typically have a structure(s) or unit for housing electronics and other required mechanical equipment utilized at the cell tower locations, for example, that must be cooled. In many cases, such housings have three sound producing openings, e.g., an air intake opening, an exhaust opening and an emergency air release opening. A rugged muffler system to accommodate such a structure, therefore, must have three components or portions constructed and installed to cover and attenuate to reduce or eradicate sound that would normally be emitted from the three openings FIG. 12 presents a side view of a rugged muffler system that comprises three muffler or barrier components, a first component 254, a second component 254' and a third component 254 (left to right in the figure), installed to cover an intake opening cover, a small exhaust (i.e., emergency) opening cover and an exhaust opening cover (not shown expressly in the figure). The first barrier component 242 has an open end 246 (at the left in the figure) and an opposing closed end. The second barrier or component 254' also has an open end 246 proximate the closed end of first component 256. The other end of the second barrier or component 256' is closed. The third barrier 256, which is a mirror image of the first component or barrier, has a closed end proximate the closed end of the second barrier 256' and an open end 246, in the right in FIG. 12. The openings facilitate free exchange of gases with the sound emitting openings of the covers but because of their respective distances therefrom are likely to emit little or no sound, which is absorbed by the sound absorbing material and on the inside surfaces thereof.

These barrier or muffler components as shown are functionally and structurally equivalent to the muffler system/component 242, depicted in FIG. 8. The length dimensions shown are calculated in consideration of the loudness and power of the measured sound, as well as the STC of the sound absorbing material (not shown in FIG. 12) emitted from each respective three openings (i.e., an air intake opening, an exhaust openings and an emergency air release opening). The three muffler or barrier components 254, 254', 254 (left to right in the figure) are 72 inches, 66 inches and 72 inches, respectively. The barrier components as shown also are approximately 15 inches wide and 7 or 8 inches.

Additionally, the invention can attenuate noise when the opening houses any low STC object that cannot be completely enclosed, such as a heating, ventilating and air conditioning (HVAC) ventilation cover, air curtain or diffuser. The invention also provides a methodology for attenuating noise from or into a room that contains at least one hole or opening for receiving a low STC object that cannot be completely enclosed, such as a HVAC ventilation cover or diffuser or other mechanism, or even the noise from the airflow sound itself through the hole.

Hearing noises such as for example, music played in one room and received in another, footsteps, speech, or environmental sounds from adjacent rooms, upper floors, pipes, from outside the dwelling or from adjacent dwellings or rooms is a disturbing event that many people experience on a daily basis. At a minimum, hearing such unwanted noises can be distracting. Many people spend large sums of money to reduce the overall transmission of sound into and/or through their dwellings in order to create quieter surroundings, as well as provide speech privacy. Various sound insulating techniques exist to significantly reduce and/or limit the transmission of sound, both airborne and impact, through the walls, ceilings and other objects contained in today's commercial and residential buildings or homes. A great deal of attention is paid to the configuration of the walls, floors and ceilings and the materials forming the same to provide for high transmission loss, which minimizes the transmission of noise from one room or space to another.

Typically, ceilings and walls have openings and/or holes formed therein to receive various devices or mechanisms including HVAC duct covers, diffusers or grills, electrical outlets, air ducts, lighting, etc. While the walls, floors and ceilings can be adequately insulated to limit noise transmission, these openings have an adverse impact on the transmission loss of the ceiling, wall, floor, door, etc., in which they are located. In particular, the HVAC duct can often transmit noise much like an optical fiber. As such, noise can enter the room or space through the opening and the device or mechanism mounted therein.

In response to the foregoing challenges, applicant has developed an innovative noise attenuation system for use on a structure having a hole or opening for some type of mechanism or conduit, such as a HVAC duct opening cover mounted therein, which cannot be addressed with a complete acoustic enclosure due to required air flow for heat or cold air distribution in a room. The inventive noise attenuation system, however, is not limited to use on structures with holes for some type of mechanism or conduit, but may be used as needed to quiet noise that might otherwise propagate from any opening in a structure, such as an opening required to accommodate a large quantity of wires. The inventive noise attenuation system is constructed to permit the absorption of noise emitted from the structure, for example, from a hole in the structure for a mechanism or conduit such that the transmission loss of the structure is not adversely impacted by the presence of the opening and/or the mechanism or conduit located therein. The noise attenuation system is also constructed to permit air flow, hot or cold from the mechanism or conduit, if required.

Figure 13:
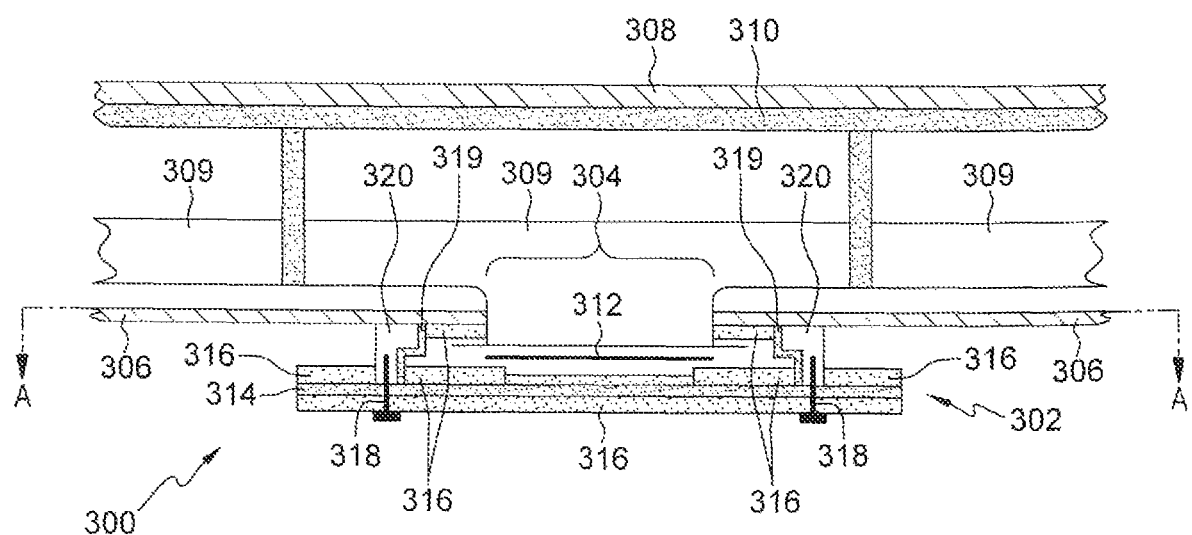
FIG. 13 depicts an embodiment of a noise attenuation system of the invention positioned over a hole or opening in a ceiling structure in a closed state.
Figure 14A:
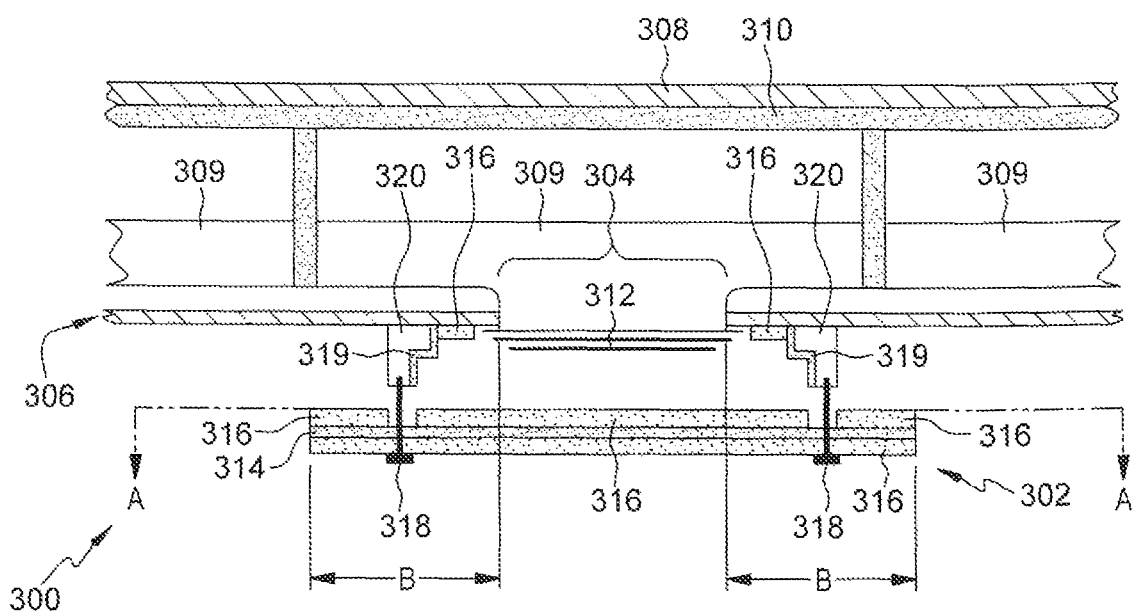
FIG. 14A depicts the noise attenuation system of FIG. 13, where the hole or opening in the ceiling structure is in an open state.
Figure 14B:
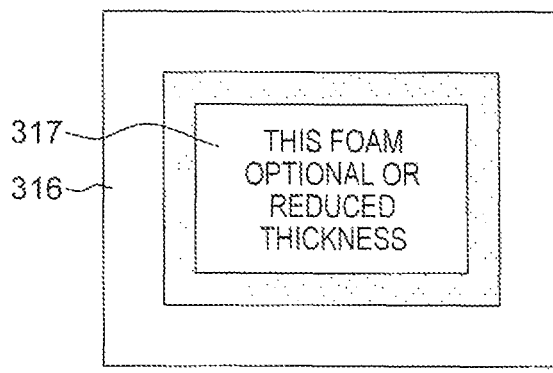
FIG. 14B FIG. 14B depicts a view looking down along lines A-A in FIGS. 13 and 14A.

As shown in FIGS. 13, 14A and 14b, an embodiment of the noise attenuation system 300 includes a noise absorbing muffler plate 302 positioned over a hole or opening 304 in a ceiling structure 306. The noise absorbing muffler plate 302 is substantially planar with a length and width defined as fixed dimensions so that any sound emitted from the hole or opening 304 is forced to travel a predetermined distance along the muffler plate before exiting the enclosure into the room. This hole or opening 304 can be just a hole, such as a plenum slot or plenum slot diffuser to an open plenum (not shown) located below a subfloor 310 under a floor 308, or connected to a duct 309 that is often attached to the subfloor 310 above. Typically, there is a mechanism 312 located in the opening 304 in the duct or plenum 309, such as a diffuser, from or through which the noise is being emitted into or out of a room, or both, with the air through the diffuser.

As shown, the noise absorbing muffler plate 302 is movably attached to the ceiling structure 306 using a means 318 that enables the muffler plate to move towards and away from the opening 304 in the structure 306, effectively limiting or enlarging the opening 304 to both air and noise. Such movable attachment means 318 comprises any device known to the skilled artisan that, would allow the muffler plate 302 to be moved relatively vertically a closed position as shown in FIG. 13 to an open position as shown in FIG. 14A and vice versa. For example, the attachment means 318 may be a screw or hook-based moveable attachment means that is rotated one way to move the muffler plate 302 up towards the structure 306 to close the opening 304 (FIG. 13) and rotated another way to move the muffler plate 302 down and away from the structure to open a path through the opening (FIG. 14A). One end of the attachment means 318 is fixed to or integral with the muffler plate 302, where its other end is attached to or integral with one of brackets 320, as shown.

The noise absorbing muffler plate 302 includes a high STC barrier layer 314, which prevents a direct path of the sound from the opening 304 into or out of the room, when the plate is in a closed position where it blocks the passage of air and noise through the opening 304 and any mechanism 312 (such as the diffuser as shown) positioned in the opening 304, such as in FIG. 13. The noise absorbing muffler plate 302 in one variation further includes one or more noise absorbing layers 316 positioned adjacent to the barrier layer 314, e.g., a noise absorbing layer 316 positioned on an upper surface of the STC barrier layer 314. Please note that another noise absorbing layer 316, or noise absorbing layer portion, may be positioned upon a lower surface of ceiling structure 306, as shown. The noise absorbing layers 316 absorb a predetermined amount of sound waves emitted from the mechanism 312 when the noise absorbing layer is in an open state (FIG. 14A), or in a partially open state, without obstructing air flow or only partially obstructing air flow. Of course when the muffler plate 302 is in a closed state (FIG. 13), the opening is effectively closed to both air flow and all noise.

Please note that elements 319 as shown are additional portions of the muffler plate 302 extending vertically along a surface of the brackets 320. Alternatively, elements 319 may comprise a layer of sound absorbing material 316, which may or may not extend integrally from the layer of sound absorbing, material 316 attached to ceiling structure 306. The elements 319 act as left and right sides to an enclosure formed by the muffler plate 302 in the embodiment shown in FIGS. 13 and 14A. Please note, however the enclosure preferably includes front and back sides formed with vertically extending portions 319 of the muffler plate 302 or sound absorbing material, without deviating from the scope or spirit of the invention. In that case, the front and rear vertically extending portions 319, with the left and right portions 319 form a complete enclosure about the hole or opening 304 when in a closed state as shown in FIG. 13

An optional third noise absorbing layer 316 can be secured to an underside of the STC barrier layer 314, as shown, which acts as a noise and/or vibration decoupling layer. That is, while the high SIC barrier layer 314 can be the outer layer of the noise absorbing muffler plate 302 and is typically backed with an outer layer of metal or material to match ceiling 306, the STC barrier layer 314 (part of muffler plate 302) is depicted in FIGS. 13 and 14A with an outer noise absorbing layer 316. The muffler plate 302 with the additional outer noise absorbing layer 316 attached underneath the STC barrier layer 314 is most commonly used when low frequency noise needs to be decoupled from the structure, or additional sound absorption is needed on that side of the plate, such as if the room has too high of a decay or reverberation time that amplifies the sounds in the room. For that matter, the additional outer noise absorbing layer 316, when secured to and below the outer SIC barrier layer 314, can operate as decorative shell for aesthetics. When the muffler plate 302 needs to be protected from such requirements as vandalism, auditory security, etc., this outer layer of sound absorbing material 316 can be coated with a protective material, for example, an acoustically transparent vinyl or even thin perforated metal, without limitation.

FIG. 14B depicts a view looking down along lines A-A in FIGS. 13 and 14A, which shows not only the sound-absorbing layer 316 but an optional layer of sound absorbing foam 317, that is deposited on sound-absorbing layer 316. This added sound absorbing layer 317 operates to effectively stop sound transmission (and the flow of air, for that matter), when the muffler plate is moved to a closed position (FIG. 13).

The invention also includes an innovative method for attenuating noise emitted from or into a ventilation duct through a duct opening, an exhaust or HVAC grill or diffuser (e.g., mechanism 312 mounted in, on or over an opening 304 in a structure such as ceiling 306, as explained above. The method includes determining the minimum length of a noise attenuating muffler plate 302 based upon a predetermined wavelength of a sound wave and predetermined percentage of the sound wave that must be suppressed, which would otherwise emanate from the opening 304 in an open or partially open position of the diffuser. This is, the minimum length of the noise attenuating plate 302 is determined based on either the wavelength of the lowest frequency that the user wishes to suppress, or the wavelength of the most common frequency the user wishes to suppress. Once the proper (minimum) length of the noise attenuating muffler plate 302 is determined, same is fabricated and mounted to the movable attachment means 318, connected or connectable to the brackets 320. The noise attenuating muffler plate is then located on or over the opening 304 in the structure 306 in an area surrounding the mechanism 312.

The noise attenuating system 300 with muffler plate 302, movable up to and away from the opening 304 by the moveable attachment means 318, absorbs a substantial part of the sound waves emitted into the opening 304 through the mechanism 312, for example, a grill, diffuser, or other device, even when the noise absorbing muffler plate 302 is positioned as shown in FIG. 14A in its open state (or partially open state) because any noise (and air) emitted therefrom or into is forced against the noise absorbing layer 316 and then must pass along the predetermined length of the plate/noise absorbing layer until it exits therefrom. The predetermined length referred to is the length from the opening or hole 304 to the physical end of the muffler plate 302. This preferably includes both orthogonal horizontal dimensions, i.e., from left to right (and vice versa) and from front to back (and vice versa), as shown in each of FIGS. 13, 14A and 14B. The reduction in noise that might normally exit or enter the opening or hole 304 is substantially equal to the sound transmission loss that would have occurred had there never been a hole or opening into a conduit or the like above the structure 306, which communicates noise.

Figure 15A:
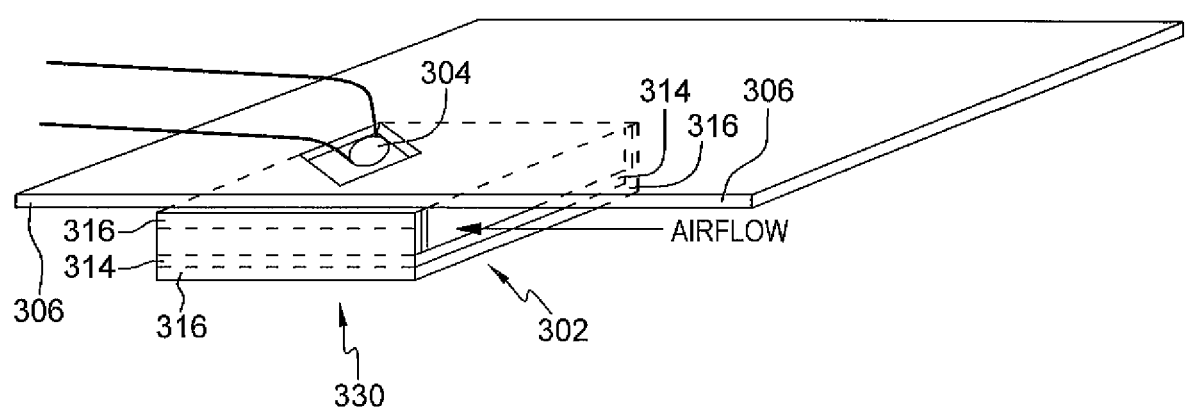
FIG. 15A depicts a side perspective view of an alternative embodiment of the noise attenuating system of FIGS. 13, 14A and 14B, highlighting a ceiling structure (only) and with opening or hole 304 therein, looking down, where the noise attenuating system is configured with noise absorbing muffler plate, and sides, which are not movable.
Figure 15B:
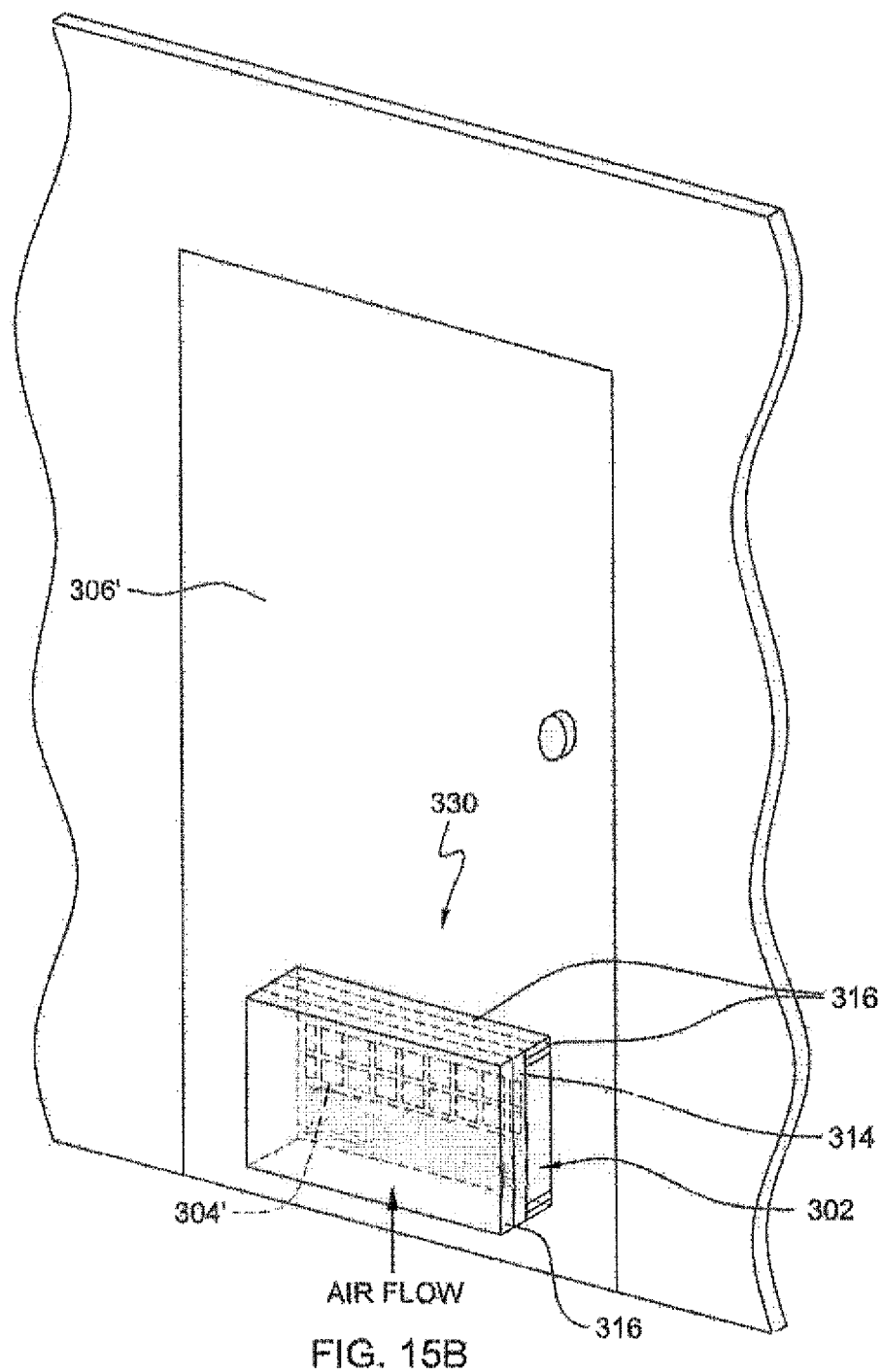
FIG. 15B depicts a side perspective view of an alternative embodiment of the noise attenuating system of FIGS. 13, 14A and 14B, highlighting a door 306' with a grill or grate 304' for air flow therein, looking towards the door, where the noise attenuating system is configured with noise absorbing muffler plate, and sides, which are not movable.
Figure 15C:
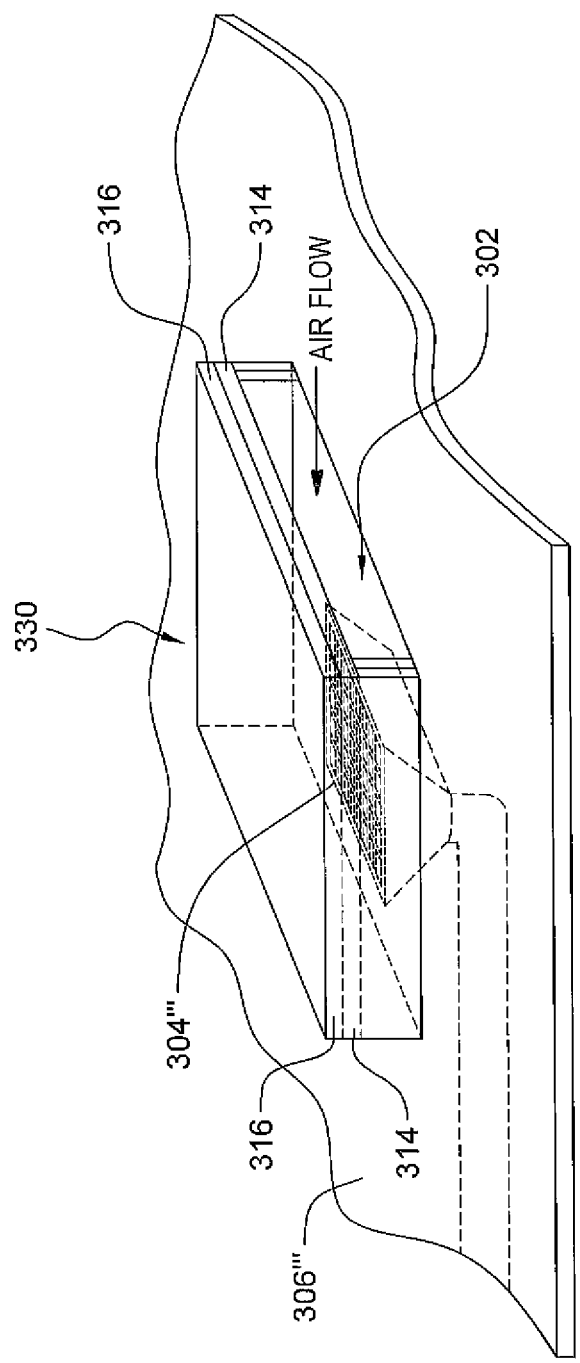
FIG. 15C depicts a side perspective view of an alternative embodiment of the noise attenuating system of FIGS. 13, 14A and 14B, highlighting a section of floor 306" with an HVAC grill or diffuser 304" (connected to a duct), looking down towards the floor, where the noise attenuating system is configured with noise absorbing muffler plate, and sides, which are not movable.

FIG. 15A depicts a side perspective view of a ceiling structure 306 (only) with opening or hole 304 therein, looking down, with a noise attenuating system 330 configured with noise absorbing muffler plate 302, as described in detail above. The noise attenuating system 330 is non-movable so is always in an "open" state. This allows the flow of air out of a mechanism (not shown) proximate hole or opening 304. Because the opening 304 is not closed, as in the embodiment depicted in FIGS. 13 and 14A, accurately determining the length of the noise absorbing muffler plate 302 is quite important and passage of the noise along the noise absorbing material 316 positioned on the inner side of the STC barrier layer 314 is what must absorb and attenuate the incoming and outgoing noise. The noise attenuation system 330 preferably includes at least two opposing side layers that both connect and stand off the lower horizontal layer from the ceiling structure 306, such that the openings are to the left and right. In some cases, a third vertical wall is included, limiting sound and airflow into and out of the opening (see arrow in FIG. 15A). This same configuration works equally well for floors, walls, doors, etc. For a door, this works well on a door 306' to a mechanical room (either inside or outside of the door; FIG. 15B) to reduce mechanical noise from exiting the mechanical room. This works well to be included as part of a toe kicker opening or just a HVAC duct grill 304" on a floor 306" (FIG. 15C), where the mechanical sounds from floor diffuser are disturbing to the room the duct feeds.

The sound generating, opening is typically positioned in the center of the muffler cavity created by the muffler plate, if the muffler is open on more than one side, or feeds at one end of the muffler if that muffler is only open on one side. The front, rear, left and right sides above the muffler plate are either all open or one or more can be completely or partially closed and if so these sides are formed with an outer barrier layer 314. Additionally, the entire muffler plate can be fully open or partially or completely closed. FIG. 13 shows, the muffler plate in a fully closed position. FIG. 4 shows the muffler plate in a fully open position.

One or more sides can slide in a bracket so as to be operable. If a side exists that is connected to the bottom muffler plate, as in 316 of FIGS. 15A, 15B and 15C, it can be permanent with a complete seal, or the bottom muffler plate can be adjustable. The adjustable variation in the bottom muffler plate allows for the distance from the front, back, left and right side the bottom to be zero with a tight seal (in a closed state), or as much space as necessary to facilitate flow of air, gas, or any other gas or liquid flow of which is accompanied in some form by unwanted sounds, or noise (in an open state). Whether it is the permanent side or the adjustable side the total distance from all open sides allows for the flow to be unaltered.

In another embodiment, the invention provides a noise attenuation system configured to substantially surround a sound generating object, for example, a packaged terminal air conditioning (PTAC) or a conventional air conditioning (AC) unit. The noise attenuation system substantially surrounds the PTAC by an enclosure for with noise absorbing muffler plate 302. Where the PTAC unit or AC unit are position on a floor, the floor can act as the bottom to the enclosure, unless a space below is required for the exhaust. Where the PTAC or AC unit is mounted in a wall off the floor, a bottom of the enclosure is required, preferably made of the same absorbing muffler plate 302. The enclosure is configured to include a tortuous path that the exhaust air from the PTAC or AC unit must travel before it is allowed to exit the enclosure, wherein any sound that might otherwise emanate is absorbed by the sound absorbing material (316) of the muffler plate 302 before it can escape. Hence, air flow exhaust (and/or openings) in the enclosure should be positioned at a predetermined distance from the openings in the PTAC or AC unit, and so not cause conflict with the heat exchange design constraints of the PTAC. Preferably, opposing entry and exhaust openings in the enclosure are positioned to maximize a distance sound is forced to travel in the enclosure and a barrier septum separating the intake and exhaust. Where the unit is a conventional AC unit, the enclosure configuration must take into account the frequency of the sound from outside (as part of a wall-mounted AC unit is outside of a wall in which it is mounted). That is, such a noise attenuation system includes the ability to reduce such things as the air flow sounds from the units, for example, to stop outdoor sound, such as road noise, from entering the HVAC unit and entering the room into which it is intended to heat, cool, or supply air.

Figure 16:
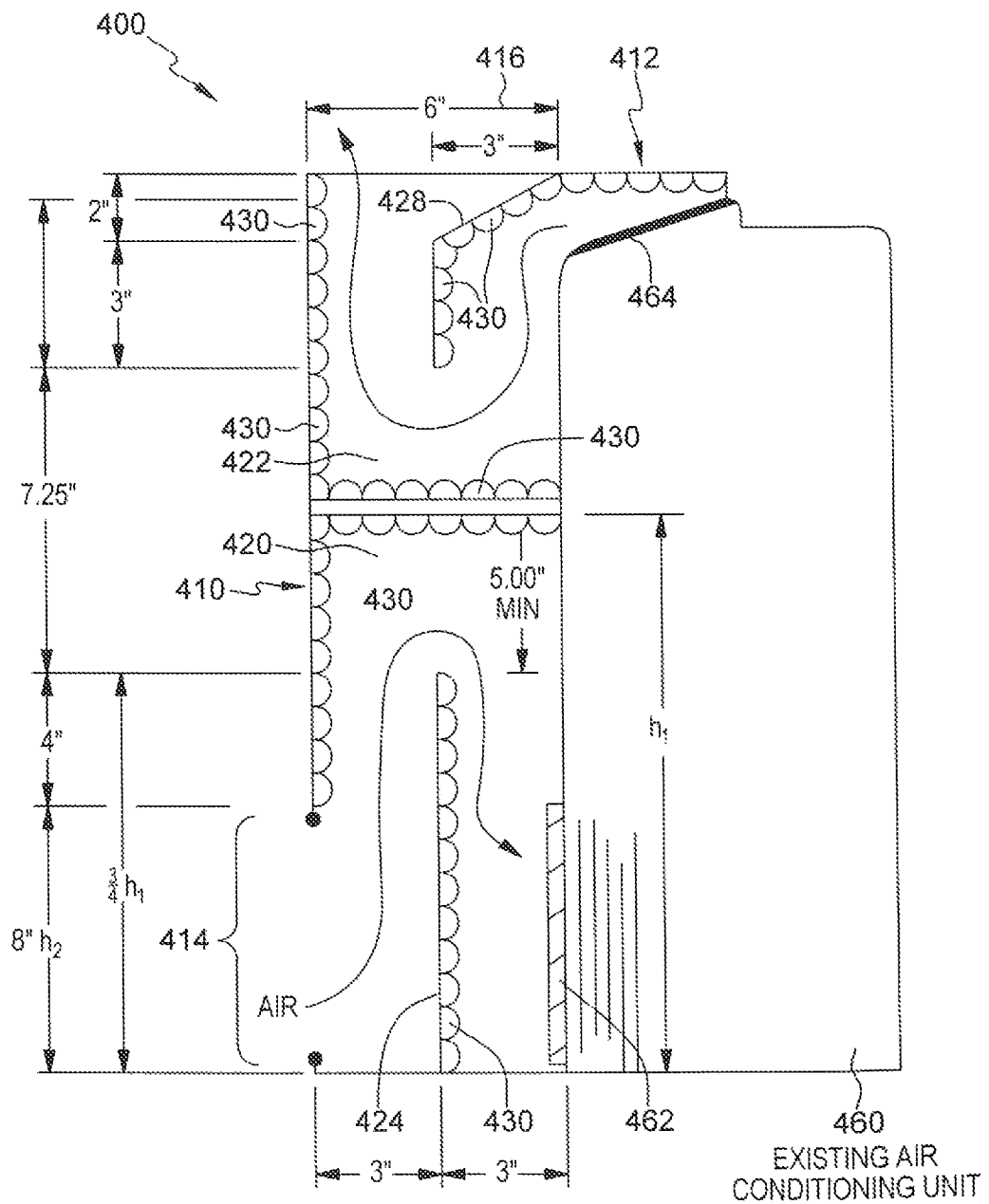
FIG. 16 depicts another embodiment of a noise attenuation system configured to substantially surround a sound generating object embodying a packaged terminal air conditioning (PTAC) unit 352, positioned on a wall above a floor.

FIG. 16 provides a detailed cross-sectional side view of such a noise attenuation system 400, provided about an existing heating and/or air conditioning unit 460. The noise attenuation system 400 comprises a number of side walls, (not all identified in the FIG. 16 cross-sectional view), e.g., a front wall 410 and a top wall 412, functionally enclosing the existing air conditioning unit 460. In this embodiment the floor is used as the bottom wall. The front wall 410 includes a front air intake opening 414 and the top wall 412 includes an upper exhaust opening 416, which is about 6" for this application. The actual dimension determined by air flow and pressure drop constraints. The inner part of the noise attenuation system 400 includes two chambers, lower chamber 420 and upper chamber 422. The walls of both chambers are lined with a sound absorbing barrier 430 as shown. Please note that the sound absorbing barrier depicted in FIG. 18 may comprise sound absorbing muffler plate 302 or merely sound absorbing material 316. The lower chamber 420 includes an inner baffle wall 424, also lined with sound absorbing or sound absorbing barrier 430 as shown, to create a tortuous absorber/barrier path for air flow through the lower chamber 420 to an intake opening 462 in the air conditioning unit 460.

The upper chamber 422, which includes exhaust opening 416, receives exhaust from exhaust 464 of air conditioner 460. The upper chamber 422 includes a baffle wall 428, also lined with the sound absorbing barrier 430 as shown, to create a tortuous absorber/barrier path from the exhaust opening 464 to exhaust opening 416 in the enclosure comprising the walls of the sound attenuating system 400. While shown in FIG. 16 as comprising a single layer of sound absorbing barrier 430, the inside surfaces of the inner walls and top of the enclosure may be formed with multiple barrier layers or a composite formed with any combination of layers of sound absorbing material 316 and STC barrier layer 314. The sound absorbing barrier 430 provided on the inner walls, such as the side walls, top and baffle walls, are preferably formed using Q622 barrier and absorber material manufactured by or for SoundSense, LLC, East Hampton, N.Y. The design as shown reduces audible noise both of Unit 460 and any sounds exterior to, the room that the AC services that could inadvertently enter the AC unit.

Please note while there are actual dimensions provided in the FIG. 16 drawing figure, the dimensions are approximate and not meant to be limiting in any way. For that matter, the dimensions are defined by the needs of the actual units and exhaust locations therein, and a predetermined distance through the inner portions, around baffles and out in order to effectively attenuate the noise.

Figure 17:
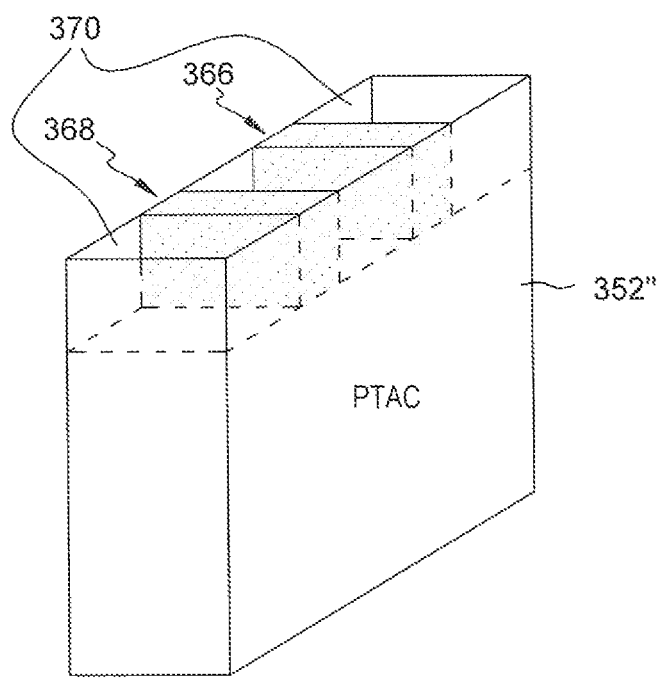
FIG. 17 depicts two blocking or baffle portions that comprise muffler plate or a variation of muffler plate that includes noise absorbing layers with an increased thickness, mounted in an interior of a HVAC, PTAC or AC unit and arranged to impeded any sound that might normally emanate therefrom.

In an application where an attenuation system 350 is not possible to implement, but a PTAC 352" or other airflow mechanism, such as exhaust fans, an HVAC unit, air curtains, etc, is noisy, requiring some kind of sound attenuation, a solution is presented in FIG. 17. That is, FIG. 17 shows for two blocking portions 366 and 368, that are inserted into a PTAC unit, AC unit or like unit to form a baffle system, where the blocking portions 366 and 368 are baffle elements with noise absorbing material that are placed to create a tortious path within the unit that the air flow and noise must follow. Each blocking portion of baffle element 366, 368 comprise muffler plate 302 or a variation of muffler plate 302 that includes noise absorbing layers with an increased thickness relative to that depicted in the earlier embodiments.

The respective plate portions 366 and 368 are dimensioned to fit inside of the actual PTAC 352" housing, proximate an opening 370 in the PTAC unit 352", to absorb as much noise as possible to prevent the absorbed noise from escaping out of the opening 370. Please note that while FIG. 17 shows two blocking portions 366 and 368, made of the muffler plate 302, the invention is not limited to the use of two, but may include only one (where necessary) or three or more, according to need. In that case, the blocking portions (like elements 366 and 368) may be placed anywhere in an AC or PTAC unit as required. For that matter, an additional configuration has noise absorbing muffler plate 302 with only a single layer of noise absorbing material 316, but with a thickness equal to a thickness of the entire noise absorbing muffler plate 302 depicted in FIGS. 13 and 14A and 14B, preferably twice the thickness, but without the STC barrier 312.

Example 1

The frequency f of concern is 500 Hz. The velocity of the sound wave $v_w$ is 1100 ft./sec. Using this information, the approximate desired length of the muffler plate 302 required by the design in FIGS. 13 and 14A [[Please verify]] can be determined.

$\lambda = (1100 \text{ ft./sec})/500 \text{ Hz} = 2.2 \text{ ft.}$

The NRC coefficient for a material for using in absorbing sound waves with a frequency f of 500 Hz is 0.95.

$\beta = \lambda/\text{NRC} = (2.2 \text{ ft.})/0.95 = 2.32 \text{ ft.}$

The minimum length of the muffler plate 302 is approximately 2.32 ft. with the mechanism 312 being located approximately in the center of the rectangular muffler plate (i.e., β as shown in FIGS. 13 and 14A) [Bonnie is that "B" or "β"]. This determined minimum length of the muffler plate 312 should provide adequate noise attenuation whereby the sound waves will be absorbed prior upon exiting the opening formed by the muffler plate (FIG. 14A), while providing sufficient space to permit ventilation of the mechanism 312 and dissipation of any heat emitted from the mechanism 312 with airflow.

Example 2

This is the same scenario as example 1, except there the muffler plate is over a vent from a duct. This duct opens into an adjacent room and that duct opening can also be treated with a muffler plate 302. Additionally, the people in the rooms with the muffler plate 302 want either partial noise reduction or total isolation. The muffler plate 302 allows the scope of the noise reduction problem to be reduced. For this example, the transmission loss due to the distance the acoustic wave traveled in the duct is considered negligible, if there is no absorbing duct liner (formed from the sound absorbing material) The only means of reducing sound traveling from one room to another via the duct is to put a muffler plate over the HVAC diffuser or mechanism 312. Depending on the level of noise reduction required and the fact that there are now two mufflers, as described above, the length could now be divided by two, since two mufflers are required to only resolve ½ wave length when in a fully open position.

It is intended that the muffler plate 302 in accordance with the present invention may be installed during the construction phase of the structure 306 or as a retrofit after construction.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A noise attenuation system, comprising a quasi-enclosure configured to substantially surround at least one pre-existing or previously-planned sound-emitting or sound-transferring opening in a working unit or structure that is positioned in a ceiling, wall or floor of a room or space, and to inhibit a direct acoustic path of sound emitted from or entering into the sound-emitting or sound-transferring opening, from or into the room or space in order that sound detected at or proximate the working unit or structure does not exceed a predetermined sound level, wherein the quasi-enclosure comprises:

a sound absorbing muffler plate that comprises at least one layer of sound absorbing material disposed upon an STC barrier layer;

wherein the quasi-enclosure comprises a substantially planar portion of the sound absorbing muffler plate from which side portions formed with the muffler plate extend vertically such that the quasi-enclosure covers the at least one sound-emitting or sound-transferring opening in the working unit or structure and inhibits sound from emanating from the working unit or structure into and/or out of the room or space;

wherein an aperture is provided in the quasi-enclosure at a predetermined distance from a location of the at least one sound-emitting or sound-transferring opening;

wherein the sound emitted from or entering the sound-emitting or sound-transferring opening travels along the predetermined distance within the quasi-enclosure to or from the aperture, during which the traveling sound is contained within the quasi-enclosure by the STC barrier layer and absorbed by the sound absorbing material based on a wavelength of a common frequency of concern, so that said emitted sound detected outside the working unit or structure is perceivably reduced and does not exceed the predetermined sound level; and wherein the substantially-planar portion of the sound-absorbing muffler plate is moveable towards and away from the sound-emitting or sound-transferring opening in the ceiling, the wall or the floor.

2. The noise attenuation system of claim 1, wherein the predetermined distance is calculated in consideration of a singular or average frequency of the sound emitted from or entering into the at least one sound-emitting or sound-transferring opening.

3. The noise attenuation system of claim 1, wherein the predetermined distance is calculated in consideration of a loudness of the sound emitted from or entering into the at least one sound-emitting or sound-transferring opening.

4. The noise attenuation system of claim 1, wherein the noise absorbing muffler plate includes at least one sound absorbing layer on opposing sides of the STC barrier layer.

5. The noise attenuation system of claim 1, wherein the predetermined distance is calculated in consideration of a sound transmission class (STC) of the barrier layer, a noise reduction coefficient (NRC) rating of the sound absorbing material, or both.

6. The noise attenuation system of claim 1, wherein the working unit or structure is a packaged terminal air conditioning (PTAC) unit, wherein the quasi-enclosure substantially surrounds the PTAC unit but for the aperture and wherein the aperture is arranged at a predetermined distance from an intake opening, an exhaust opening or both in the PTAC unit, while not compromising the required airflow of the intake and exhaust.

7. The noise attenuation system of claim 1, wherein the working unit or structure is an air conditioning (AC) unit, wherein the quasi-enclosure substantially surrounds the AC unit on an inside portion of the AC unit but for the aperture and wherein the aperture is arranged at a predetermined distance from an exhaust opening of AC unit.

8. A noise attenuation system, comprising a quasi-enclosure configured to substantially surround at least one pre-existing or previously-planned sound-emitting or sound-transferring opening in a door to a volume in which noise-generating mechanical equipment is positioned, and to inhibit a direct acoustic path of sound emitted from the sound-emitting or sound-transferring opening in the door, into a room or space in order that sound detected in the room or space proximate the door does not exceed a predetermined sound level for the room or space, wherein the quasi-enclosure comprises:

a sound absorbing muffler plate that comprises at least one layer of sound absorbing material disposed upon an STC barrier layer;

wherein the quasi-enclosure comprises a substantially planar portion of the sound absorbing muffler plate from which side portions formed with the muffler plate extend vertically such that the quasi-enclosure covers the at least one sound-emitting or sound-transferring opening in the door and inhibits sound emitted from the noise generating mechanical equipment from emanating from the volume into the room or space;

wherein an aperture is provided in the quasi-enclosure at a predetermined distance from a location of the at least one sound-emitting or sound-transferring opening in the door;

wherein the sound emitted from or entering the sound-emitting or sound-transferring opening travels along the predetermined distance within the quasi-enclosure to or from the aperture, during which the travelling sound is contained within the quasi-enclosure by the STC barrier layer and absorbed by the sound absorbing material, based on a wavelength of a common frequency of concern, so that said emitted sound detected outside the volume does not exceed the predetermined level sound; and wherein the substantially-planar portion of the sound-absorbing muffler plate is moveable towards and away from the sound-emitting or sound-transferring opening in the door.

9. A noise attenuation system, comprising a quasi-enclosure configured to substantially surround at least one pre-existing or previously-planned sound-emitting or sound-transferring opening in a HVAC grill on a floor, attached to a duct under the floor, to inhibit a direct acoustic path of sound emitted from or entering into the sound-emitting or sound-transferring opening, from or into the HVAC grill and duct in order that sound detected in a room or space proximate the HVAC grill does not exceed a predetermined level, wherein the quasi-enclosure comprises:

a sound absorbing muffler plate that comprises at least one layer of sound absorbing material disposed upon an STC barrier layer;

wherein the quasi-enclosure comprises a substantially planar portion of the sound absorbing muffler plate from which side portions formed with the muffler plate extend vertically such that the quasi-enclosure covers the at least one sound-emitting or sound-transferring opening in the HVAC grill on the floor and inhibits sound from emanating from or into the HVAC grill on a floor into the room or space;

wherein an aperture is provided in the quasi-enclosure at a predetermined distance from a location of the at least one sound-emitting or sound-transferring opening in the HVAC grill;

wherein the sound emitted from or entering the sound-emitting or sound-transferring opening travels along the predetermined distance within the quasi-enclosure to or from the aperture, during which the traveling sound is contained within the quasi-enclosure by the STC barrier layer and absorbed by the sound-absorbing material, based on a wavelength of a common frequency of concern, so that said emitted sound detected outside the HVAC grill does not exceed the predetermined level sound for the room or space; and wherein the substantially-planar portion of the sound-absorbing muffler plate is moveable towards and away from the sound-emitting or sound-transferring opening in the HVAC grill on the floor.

10. The noise attenuation system of claim 1, further comprising movable attachment means disposed on the substantially planar portion of the sound absorbing muffler plate that are rotated in a first direction to move the substantially parallel planar portion of the muffler plate towards the opening and are rotated in a second direction to move the substantially parallel planar portion of the muffler plate away from the opening.

11. The noise attenuation system of claim 8, further comprising movable attachment means disposed on the substantially planar portion of the sound absorbing muffler plate that are rotated in a first direction to move the substantially parallel planar portion of the muffler plate towards the opening and are rotated in a second direction to move the substantially parallel planar portion of the muffler plate away from the opening.

12. The noise attenuation system of claim 9, further comprising movable attachment means disposed on the substantially planar portion of the sound absorbing muffler plate that are rotated in a first direction to move the substantially parallel planar portion of the muffler plate towards the opening and are rotated in a second direction to move the substantially parallel planar portion of the muffler plate away from the opening.

\* \* \* \* \*